United States Patent
Singh et al.

(10) Patent No.: US 11,568,341 B2
(45) Date of Patent: Jan. 31, 2023

(54) DYNAMIC RESOURCE ALLOCATION

(71) Applicant: Citrix Systems, Inc., Fort Lauderdale, FL (US)

(72) Inventors: Manbinder Pal Singh, Coral Springs, FL (US); Harsh Shah, Pompano Beach, FL (US); Rachelle Tobkes, Davie, FL (US); Jacob Summers, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 205 days.

(21) Appl. No.: 16/876,998

(22) Filed: May 18, 2020

(65) Prior Publication Data

US 2021/0357834 A1    Nov. 18, 2021

(51) Int. Cl.
*G06Q 10/06* (2012.01)
*G06Q 10/10* (2012.01)
*H04L 67/306* (2022.01)
*H04L 67/50* (2022.01)

(52) U.S. Cl.
CPC ... *G06Q 10/06314* (2013.01); *G06Q 10/1095* (2013.01); *H04L 67/306* (2013.01); *H04L 67/535* (2022.05)

(58) Field of Classification Search
CPC .............. G06Q 10/06314; G06Q 10/95; H04L 67/535; H04L 67/306
USPC ....................................................... 705/7.24
See application file for complete search history.

(56) References Cited

U.S. PATENT DOCUMENTS

| | | | |
|---|---|---|---|
| 2014/0143352 A1* | 5/2014 | Yegnashankaran | H04L 67/306 709/206 |
| 2014/0278086 A1* | 9/2014 | San Filippo | G01C 21/3423 701/527 |
| 2015/0039357 A1* | 2/2015 | Segal | G06Q 50/01 705/5 |
| 2016/0098687 A1* | 4/2016 | Lamons | G06Q 10/1095 705/7.19 |
| 2016/0148163 A1* | 5/2016 | Beaumont | G06Q 10/1095 705/7.19 |
| 2021/0006650 A1* | 1/2021 | Yankov | G06Q 10/0833 |
| 2021/0056450 A1* | 2/2021 | Catalano | G06N 7/005 |
| 2022/0083983 A1* | 3/2022 | Lee | G06Q 10/1095 |

\* cited by examiner

*Primary Examiner* — Alan S Chou
(74) *Attorney, Agent, or Firm* — Banner & Witcoff, Ltd.

(57) ABSTRACT

Methods and systems for resource allocation using data from a variety of systems are described herein. A plurality of periods of time for using one or more resources may be identified based on a user request. Data indicative of locations of one or more users over one or more time periods may be received. Such data may be from an application other than a calendar application. Anticipated locations of the one or more users may be determined based on the data received. A resource of the one or more resources may be selected based on a distance between the resource and the anticipated locations of the one or more users. Based on detecting a change to the data, a new resource may be selected.

20 Claims, 9 Drawing Sheets

DYNAMIC RESOURCE ALLOCATION

FIELD

Aspects described herein generally relate to computer networking and hardware and software related thereto. More specifically, one or more aspects describe herein provide allocation of resources based on data of one or more computing devices.

BACKGROUND

Enterprises may maintain a variety of resources which may be time- and occupancy-limited. For example, an enterprise may own a 3D printer which may be used by only one user at a time, and that 3D printer may take an average of one hour to complete a particular task. In such a situation, the enterprise may maintain resources—for example, hour-long blocks of time during which the 3D printer may be used by a single user—for allocation among a wide variety of individuals. Such enterprises may task individuals with maintaining a schedule or using some other method to try to allocate the one or more resources; however, such methods lack contextual information which may impact the accuracy and efficiency of allocation determinations. For example, scheduling 3D printer time on a shared calendar might be convenient, but might not account for sudden changes in users' schedules and other external factors which might make previously-made allocations no longer efficient.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards resource allocation. For example, a computing device may identify a plurality of periods of time in which to access one or more resources. The plurality of periods of time may be based on schedule data maintained by a calendar application and/or based on inputs from a user of the computing device. The inputs from the user of the computing device may indicate a requested range of time in which to use the one or more resources. The computing device may receive, from a remote application different from the calendar application, data that indicates anticipated locations of one or more users within the requested range of time. The computing device may compare locations associated with the one or more resources with the anticipated locations of the one or more users within the requested range of time by generating, for at least one of the one or more users, a score based on a geographical distance between the anticipated locations of the one or more users during the requested range of time and the locations associated with the one or more resources. The computing device may select, from the one or more resources, a resource. The selecting the resource may be based on the comparing. The first resource may be accessible by the user of the computing device and the one or more users within the requested range of time.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
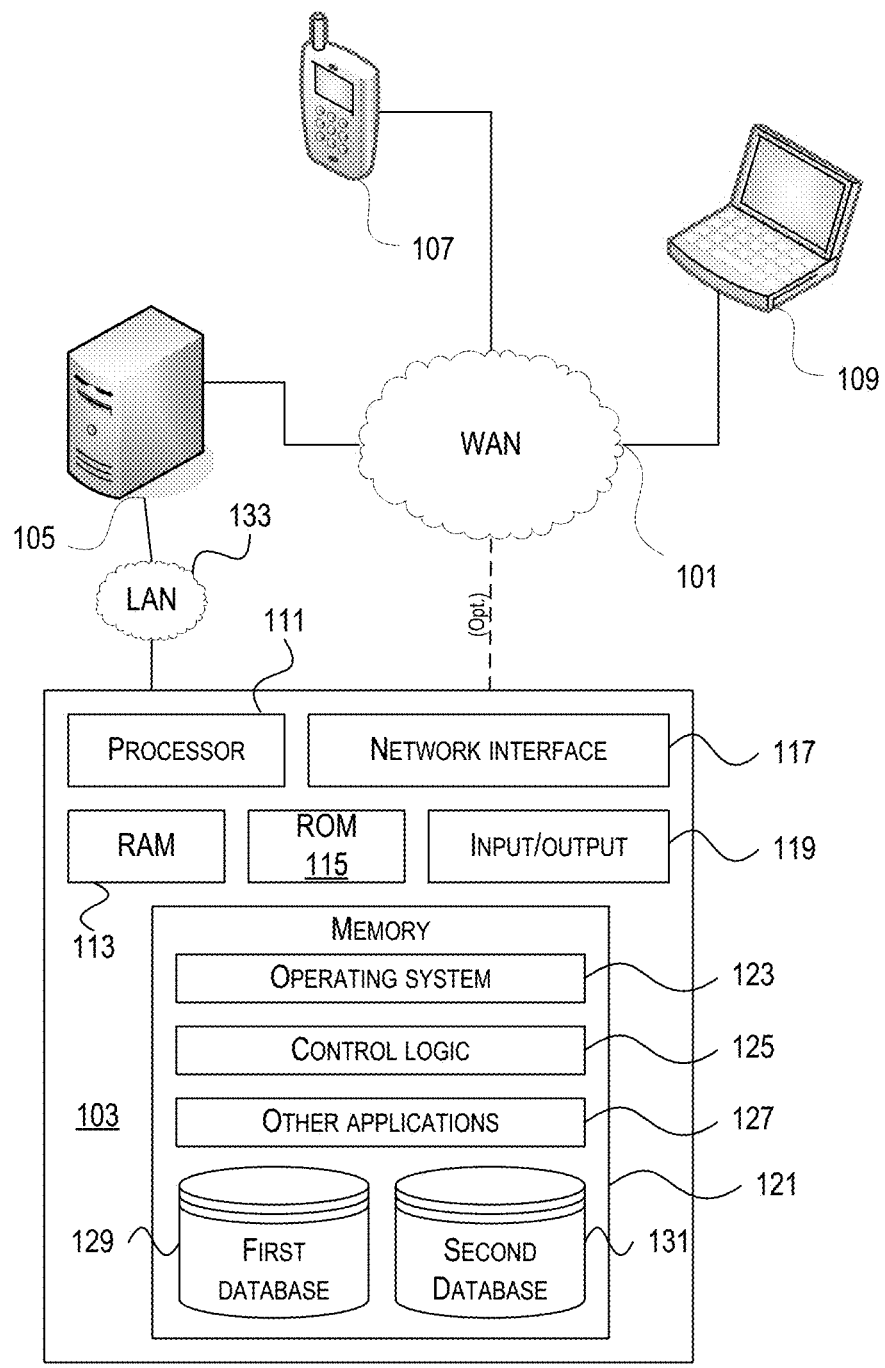
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

Computing devices may store a wide variety of data, but enterprises still struggle to use such data when deciding how to allocate resources. For example, an enterprise may have servers storing a wide variety of personnel data, schedule data, network infrastructure data, information technology department data, and the like, and yet it might still be difficult for the enterprise to determine how to allocate resources (e.g., time slots for laboratory equipment, 3D printers, meeting rooms) amongst users of those resources based on that data. This is particularly the case where some data may reflect real-world considerations (e.g., available hours of the laboratory equipment) which may be unpredictable and/or may require special treatment. For example, though it may be desirable to hold a meeting in a particular meeting room at a particular time, such a meeting room may be undesirably far from the attendees during that period of time, lack the proper network capabilities (or other resources) to support the meeting, and/or may be otherwise occupied due to unforeseen circumstances that arise after the meeting is scheduled. Conventional software used by enterprises, such as calendar applications and scheduling software, are generally insufficient to remedy this deficiency at least because such applications generally do not account for context data, such as personnel data, schedule data, network infrastructure data, information technology department data, and the like. For example, the OUTLOOK email and calendar application developed by Microsoft Corporation of Redmond, Wash. might be configured to aid users in scheduling appointments (e.g., to use a 3D printer), but such an application does not account for, for example, context data indicating the particular operating requirements of the 3D printer (e.g., when it might need repair), whether a user might be available at a particular time (e.g., or on sick leave), the geographical distance of the 3D printer from those scheduling use of the 3D printer, or the like. Moreover, such applications do not account for changes in context data: for example, those applications are not configured to make resource allocation changes if a user is unexpectedly sick and unable to use the 3D printer at an otherwise-scheduled time.

As a general introduction to the subject matter described in more detail below, aspects described herein are directed towards resource allocation. A computing device may identify a plurality of periods of time in which one or more resources may be accessed by one or more users of the one or more resources. The plurality of periods of time may be based on schedule data maintained by a calendar application and/or based on inputs received via one or more computing devices. The schedule data may indicate schedules of one or more users of the calendar application over a requested range of time. The inputs may indicate the requested range of time in which to use the one or more resources. The computing device may receive, from a remote application different from the calendar application, data that indicates anticipated locations of one or more users of the remote application within the requested range of time. The remote application may comprise a building access system. The building access system may comprise data indicating access, by one or more individuals (e.g., employees of a company), to one or more locations (e.g., one or more rooms). The anticipated location of the one or more users of the remote application may be based on such data. The computing device may compare locations of the one or more resources with the anticipated locations of the one or more users of the one or more resources within the requested range of time by generating, for at least one of the one or more users, a score based on a geographical distance between the anticipated locations of the one or more users during the requested range of time and the locations associated with the one or more resources. The computing device may select, from the one or more resources, a first resource. The selecting the first resource may be based on the comparing of the location of the one or more resources with the anticipated locations of the one or more users of the one or more resources. The selecting the first resource may be based on received indications of the availability of one or more users of the one or more resources (e.g., historical availability), which may be received by a second remote application different from the calendar application. The selecting the first resource may be based on received weather data indicating anticipated weather associated with the requested range of time, which may be received by a second remote application different from the calendar application. The selecting the first resource may be based on determining that at least one of the one or more users of the one or more resources are a distance from locations of the one or more resources. The one or more resources may be one or more meeting rooms, and selecting the first resource may comprise comparing a count of the one or more users of the one or more resources to occupancy limits of the one or more meeting rooms. The first resource may be accessible by the user of the computing device and the one or more users within the requested range of time. A change may be detected in the schedule data of one or more users scheduled to use the first resource, and a change may be made to the resource allocation based on the change detected in the schedule data. Detecting the change may comprise querying a device of at least one of the one or more users of the one or more resources, receiving a current location of the at least one of the one or more users, and determining, based on the current location, that at least one of the one or more users is greater than a distance (e.g., a predetermined distance) from a first location of the first resource.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Any component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
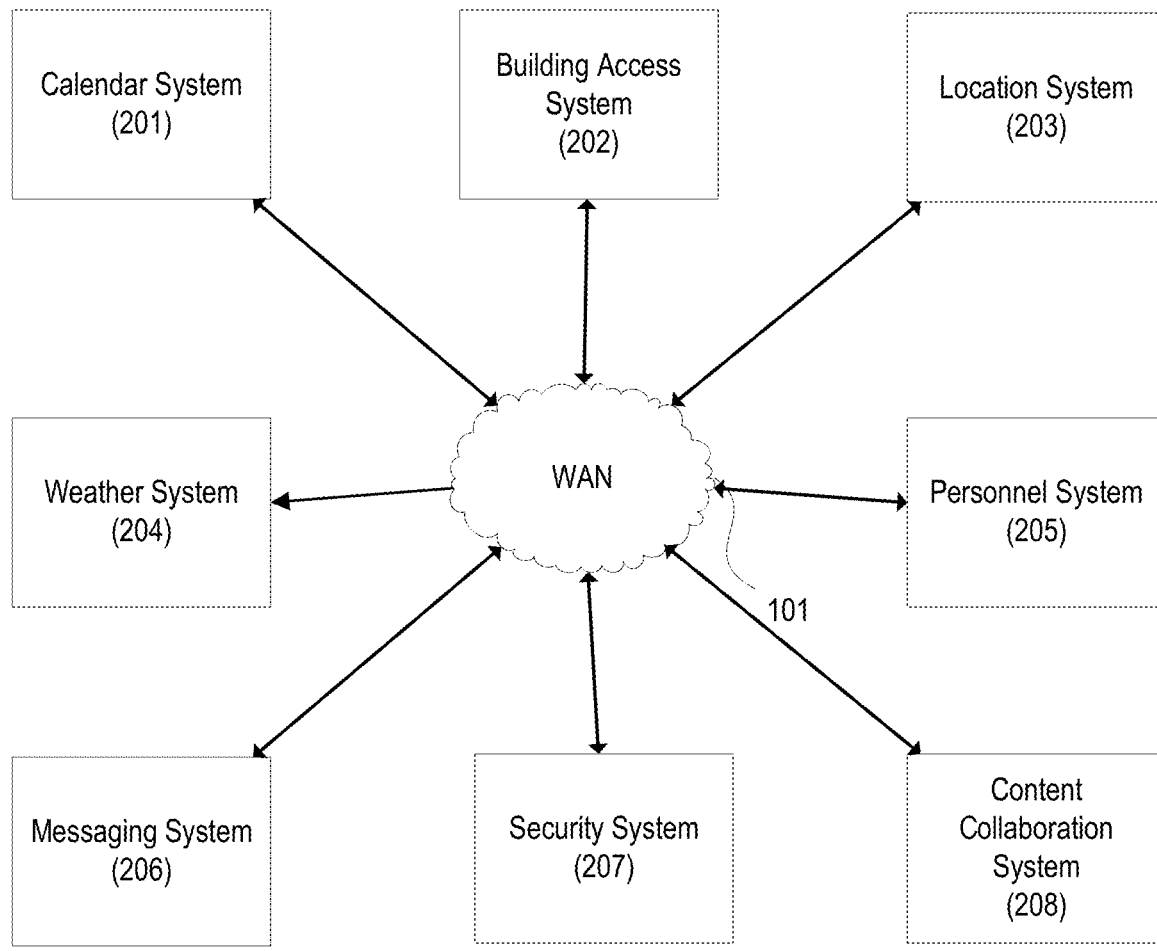
FIG. 2 depicts one or more systems which may store data used during resource allocation.

FIG. 2 depicts one or more systems, connected via the network 101, which may be executed in whole or in part on one or more of the data server 103, the web server 105, and/or the client computers 107, 109. FIG. 2 shows a calendar system 201, a building access system 202, a location system 203, a weather system 204, a personnel system 205, a messaging system 206, a security system 207, and a content collaboration system 208. Any of the systems 201-208 may execute on one or more computing devices, such as the same server or different servers, and may be communicatively coupled using one or more different networks, such as the network 101. Collectively, the data maintained by the systems 201-208 may be referred to as context data. Some or all of the data managed by any of the systems 201-208 may be interrelated with other data managed by any of the systems 201-208. For example, user security data managed by the security system 207 may be used by the building access system 202 to grant access to one or more of the users of the building access system 202.

The calendar system 201 may comprise one or more applications which may schedule of one or more users or resources. For example, the calendar system 201 may schedule a meeting room in a building, the schedule of laboratory equipment, or the like. As another example, the calendar system 201 may schedule an individual, such as an employee of an enterprise. Data of the calendar system 201 may be partially obfuscated to preserve the privacy of one or more users. For example, data of the calendar system 201 may indicate that a user is busy on a particular hour of a day, but not indicate the reason why the user is busy.

The building access system 202 may comprise one or more applications which may control physical access to locations. For example, the building access system may determine, based on identification cards presented by users at entrances of a building, whether to allow users to enter the building. Data stored by the building access system 202 may also indicate whether a user is in a particular location (e.g., a building, an office floor, or the like).

The location system 203 may monitor one or more locations, such as locations of users and locations of enterprise resources (e.g., conference rooms, 3D printers, and the like). The location system 203 may include maps of one or more locations, data indicating a size and/or capabilities of the one or more locations, or the like. For example, the location system 203 may be used to determine a distance between two locations, such that the location system 203 may determine whether one location (e.g., a conference room) is closer to a user than another location (e.g., a different conference room). As another example, the location system 203 may determine how many individuals may be seated in a particular conference room. The location system 203 may additionally and/or alternatively include data indicating travel to the one or more locations, such as traffic nearby the one or more locations, road closures to the one or more locations, construction near the one or more locations, or the like. For example, the location system 203 may comprise the indoor positioning and wayfinding technologies developed by SPREO Indoor Location Solutions of New York, N.Y.

The weather system 204 may comprise one or more applications that monitor weather and/or environment of one or more locations. The weather system 204 may query one or more external databases (e.g., public weather information systems) to determine or otherwise retrieve weather information. The weather system 204 may also include environmental data, such as air quality information. Such data may be used to determine, for example, whether one or more users of the one or more resources might not be able to use a particular resource (e.g., in a particular way, at a particular time). For example, if the one or more resources are a telescope, rain may negatively impact the ability of the users to use the telescope.

The personnel system 205 may comprise one or more applications that include data of one or more individuals that are part of an enterprise (e.g., a company). The data may comprise employment information, workday information, user certification information, or the like. The data may comprise information collected by monitoring one or more users over time, such as information indicating preferred work hours of a user, times in which the user is typically available for meetings, or the like. The data may comprise historic meeting time preference information for a plurality of users, which may indicate one or more time periods (e.g., a preferred time of day, such as mornings) when users typically attended and/or accepted meeting invites. The data may indicate, for example, whether the user is likely to accept requests (e.g., for a meeting) from other users, whether the user is likely to not use resources previously assigned to that user, or the like. Other factors may include whether the user has weekly and/or daily habits, such as avoiding utilizing resources during lunchtime, avoiding using resources located in certain locations, avoiding using resources due to the weather, or the like.

The messaging system 206 may comprise one or more applications which permit communications between two or more users. For example, the messaging system 206 may comprise e-mail applications, chat applications, and other similar applications. The messaging system 206 may comprise data which relates to the one or more locations and/or one or more users referenced with respect to the location system 203 and the personnel system 205. For example, one or more messages in the messaging system 206 may indicate that two users are meeting in a particular conference room, meaning both that the users are busy and that the conference room is occupied at that time.

The security system 207 may comprise one or more applications which control or otherwise monitor physical and/or digital security. The security system 207 may comprise physical security applications such as cameras, motion detectors, digital locks, or the like. The security system 207 may comprise digital security applications such as firewalls.

The content collaboration system 208 may comprise one or more applications to enable the accomplishment of projects and/or tasks by groups of users. The projects and/or tasks may relate to operation of a business. The content collaboration system 208 may comprise data of the one or more locations and/or one or more users referenced with respect to the location system 203 and the personnel system 205.

The systems 201-208 may be interrelated. All or portions of the systems 201-208 may rely on the same or similar applications and/or may execute on the same or similar computing devices. Some systems, such as the building access system 202, may be part of other systems, such as the security system 207. Systems, such as the messaging system 206, may have access to data from other systems, such as the calendar system 201, to perform some tasks (e.g., displaying whether the user is in the office and available to chat).

Figure 3A:
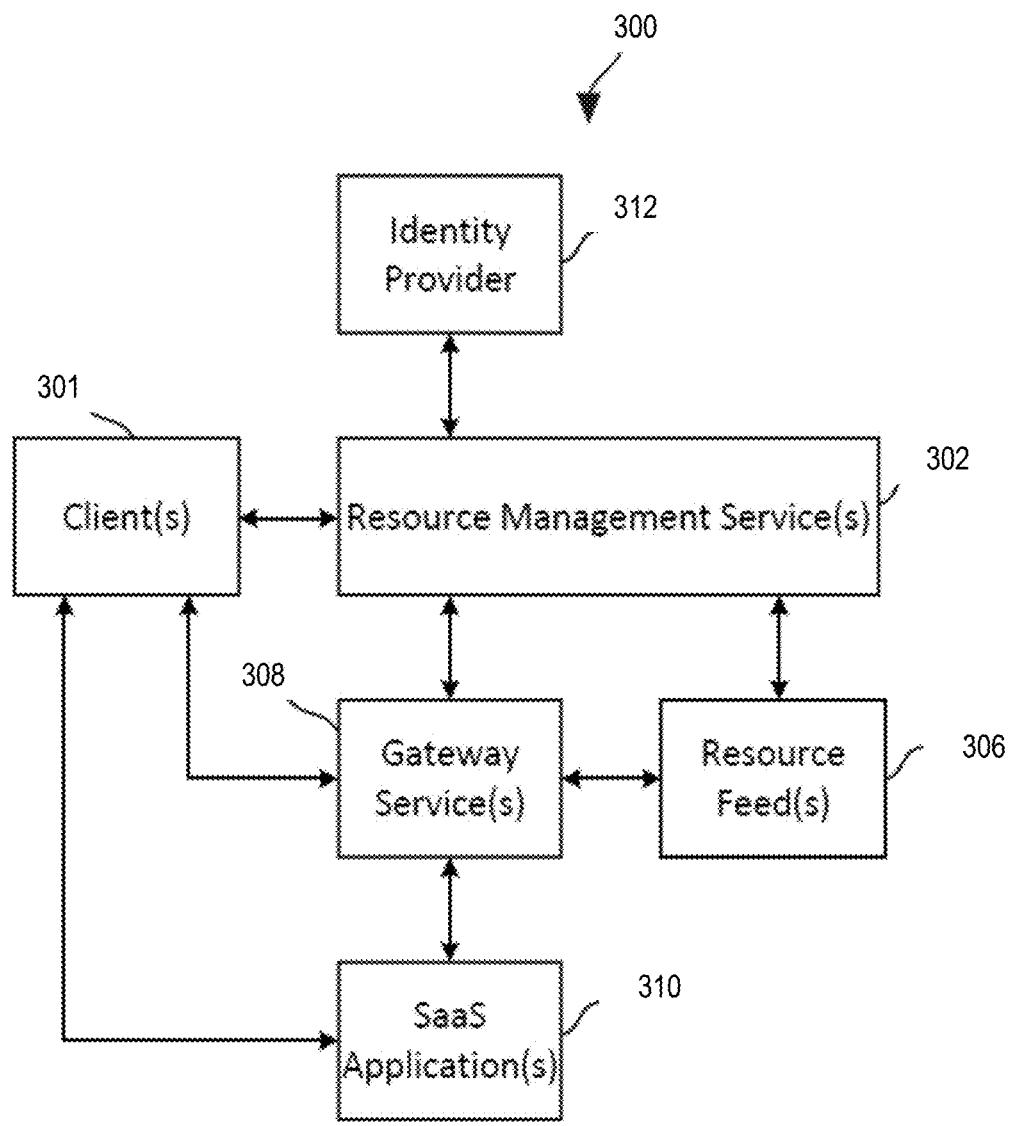
FIG. 3A is a block diagram of an example system in which resource management services may manage and streamline access by clients to resource feeds (via one or more gateway services) and/or software-as-a-service (SaaS) applications.

FIG. 3A is a block diagram of an example system 300 in which one or more resource management services 302 may manage and streamline access by one or more clients 301 to one or more resource feeds 306 (via one or more gateway services 308) and/or one or more software-as-a-service (SaaS) applications 310. In particular, the resource management service(s) 302 may employ an identity provider 312 to authenticate the identity of a user of a client 301 and, following authentication, identify one of more resources the user is authorized to access. In response to the user selecting one of the identified resources, the resource management service(s) 302 may send appropriate access credentials to the requesting client 301, and the client 301 may then use those credentials to access the selected resource. For the resource feed(s) 306, the client may use the supplied credentials to access the selected resource via a gateway service 308. For the SaaS application(s) 310, the client 301 may use the credentials to access the selected application directly.

The client(s) 301 may be any type of computing devices capable of accessing the resource feed(s) 306 and/or the SaaS application(s) 310, and may, for example, include a variety of desktop or laptop computers, smartphones, tablets, etc. The resource feed(s) 306 may include any of numerous resource types and may be provided from any of numerous locations. In some embodiments, for example, the resource feed(s) 306 may include one or more systems or services for providing virtual applications and/or desktops to the client(s) 301, one or more file repositories and/or file sharing systems, one or more secure browser services, one or more access control services for the SaaS applications 310, one or more management services for local applications on the client(s) 301, one or more internet enabled devices or sensors, etc. Any of the resource management service(s) 302, the resource feed(s) 306, the gateway service(s) 308, the SaaS application(s) 310, and the identity provider 312 may be located within an on-premises data center of an xzorganization for which the system 300 is deployed, within one or more cloud computing environments, or elsewhere.

Figure 3B:
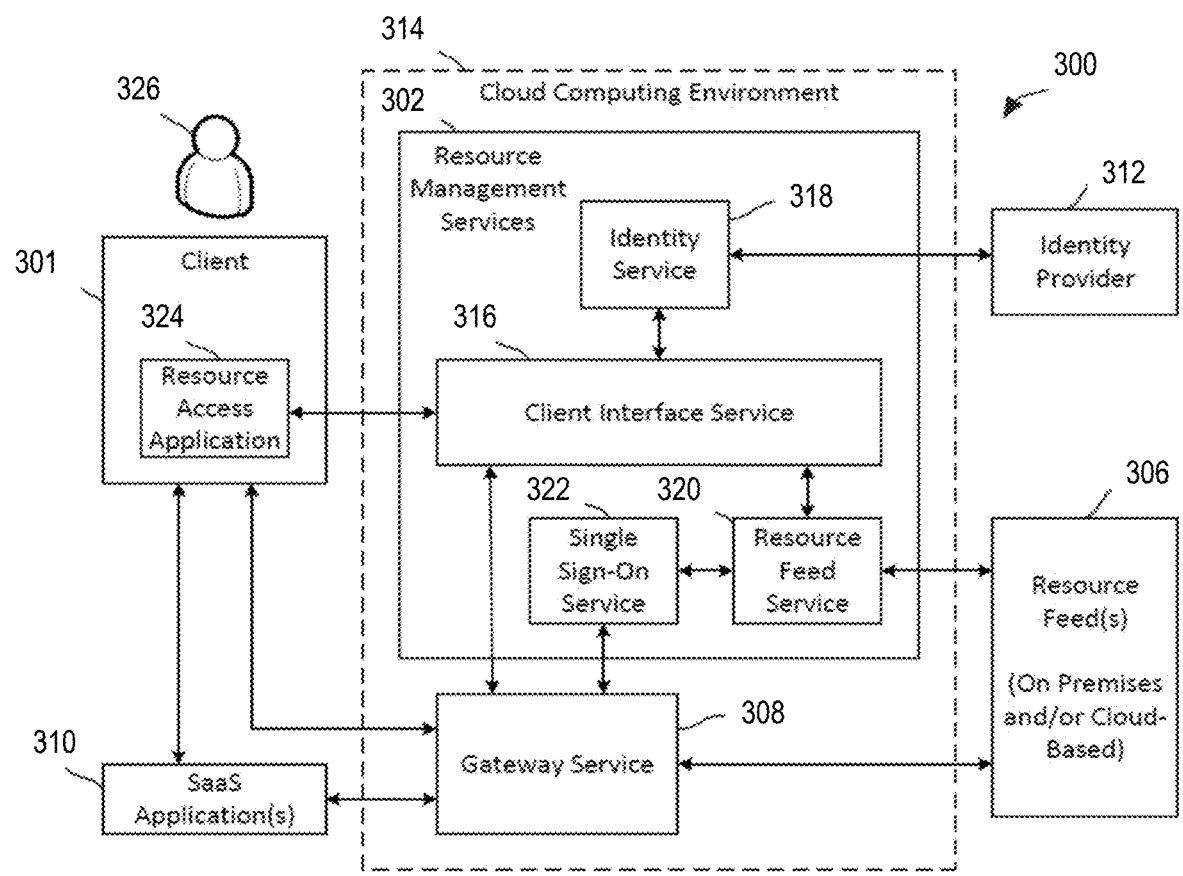
FIG. 3B is a block diagram showing an example implementation of the system shown in FIG. 3A in which various resource management services as well as a gateway service are located within a cloud computing environment.

FIG. 3B is a block diagram showing an example implementation of the system 300 shown in FIG. 3A in which various resource management services 302 as well as a gateway service 308 are located within a cloud computing environment 313. The cloud computing environment may, for example, include Microsoft Azure Cloud, Amazon Web Services, Google Cloud, or IBM Cloud.

For any of illustrated components (other than the client 301) that are not based within the cloud computing environment 314, cloud connectors (not shown in FIG. 3B) may be used to interface those components with the cloud computing environment 314. Such cloud connectors may, for example, run on Windows Server instances hosted in resource locations and may create a reverse proxy to route traffic between the site(s) and the cloud computing environment 314. In the illustrated example, the cloud-based resource management services 302 include a client interface service 316, an identity service 318, a resource feed service 320, and a single sign-on service 322. As shown, in some embodiments, the client 301 may use a resource access application 324 to communicate with the client interface service 316 as well as to present a user interface on the client 301 that a user 326 can operate to access the resource feed(s) 306 and/or the SaaS application(s) 310. The resource access application 324 may either be installed on the client 301, or may be executed by the client interface service 316 (or elsewhere in the system 300) and accessed using a web browser (not shown in FIG. 3B) on the client 301.

As explained in more detail below, in some embodiments, the resource access application 324 and associated components may provide the user 326 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 324 is launched or otherwise accessed by the user 326, the client interface service 316 may send a sign-on request to the identity service 318. In some embodiments, the identity provider 312 may be located on the premises of the organization for which the system 300 is deployed. The identity provider 312 may, for example, correspond to an on-premises Windows Active Directory. In such embodiments, the identity provider 312 may be connected to the cloud-based identity service 318 using a cloud connector (not shown in FIG. 3B), as described above. Upon receiving a sign-on request, the identity service 318 may cause the resource access application 324 (via the client interface service 316) to prompt the user 326 for the user's authentication credentials (e.g., user-name and password). Upon receiving the user's authentication credentials, the client interface service 316 may pass the credentials along to the identity service 318, and the identity service 318 may, in turn, forward them to the identity provider 312 for authentication, for example, by comparing them against an Active Directory domain. Once the identity service 318 receives confirmation from the identity provider 312 that the user's identity has been properly authenticated, the client interface service 316 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 301 to be redirected to the cloud-based identity service to complete an authentication process. The cloud-based identity service may then cause the client 301 to prompt the user 326 to enter the user's authentication credentials. Upon determining the user's identity has been properly authenticated, the cloud-based identity service may send a message to the resource access application 324 indicating the authentication attempt was successful, and the resource access application 324 may then inform the client interface service 316 of the successfully authentication. Once the identity service 318 receives confirmation from the client interface service 316 that the user's identity has been properly authenticated, the client interface service 316 may send a request to the resource feed service 320 for a list of subscribed resources for the user 326.

For any one of the configured resource feed(s), the resource feed service 320 may request an identity token from the single sign-on service 322. The resource feed service 320 may then pass the feed-specific identity tokens it receives to the points of authentication for the respective resource feeds 306. The resource feed 306 may then respond with a list of resources configured for the respective identity. The resource feed service 320 may then aggregate all items from the different feeds and forward them to the client interface service 316, which may cause the resource access application 324 to present a list of available resources on a user interface of the client 301. The list of available resources may, for example, be presented on the user interface of the client 301 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 301, and/or one or more SaaS applications 310 to which the user 326 has subscribed. The lists of local applications and the SaaS applications 310 may, for example, be supplied by resource feeds 306 for respective services that manage which such applications are to be made available to the user 326 via the resource access application 324. Examples of SaaS applications 310 that may be managed and accessed as described herein include Microsoft Office 365 applications, SAP SaaS applications, Workday applications, etc.

For resources other than local applications and the SaaS application(s) 310, upon the user 326 selecting one of the listed available resources, the resource access application 324 may cause the client interface service 316 to forward a request for the specified resource to the resource feed service 320. In response to receiving such a request, the resource feed service 320 may request an identity token for the corresponding feed from the single sign-on service 322. The resource feed service 320 may then pass the identity token received from the single sign-on service 322 to the client interface service 316 where a launch ticket for the resource may be generated and sent to the resource access application 324. Upon receiving the launch ticket, the resource access application 324 may initiate a secure session to the gateway service 308 and present the launch ticket. When the gateway service 308 is presented with the launch ticket, it may initiate a secure session to the appropriate resource feed and present the identity token to that feed to seamlessly authenticate the user 326. Once the session initializes, the client 301 may proceed to access the selected resource.

When the user 326 selects a local application, the resource access application 324 may cause the selected local application to launch on the client 301. When the user 326 selects a SaaS application 310, the resource access application 324 may cause the client interface service 316 request a one-time uniform resource locator (URL) from the gateway service 308 as well a preferred browser for use in accessing the SaaS application 310. After the gateway service 308 returns the one-time URL and identifies the preferred browser, the client interface service 316 may pass that information along to the resource access application 324. The client 301 may then launch the identified browser and initiate a connection to the gateway service 308. The gateway service 308 may then request an assertion from the single sign-on service 322. Upon receiving the assertion, the gateway service 308 may cause the identified browser on the client 301 to be redirected to the logon page for identified SaaS application 310 and present the assertion. The SaaS may then contact the gateway service 308 to validate the assertion and authenticate the user 326. Once the user has been authenticated, communication may occur directly between the identified browser and the selected SaaS application 310, thus allowing the user 326 to use the client 301 to access the selected SaaS application 310.

In some embodiments, the preferred browser identified by the gateway service 308 may be a specialized browser embedded in the resource access application 324 (when the resource application is installed on the client 301) or provided by one of the resource feeds 306 (when the resource application 324 is located remotely), e.g., via a secure browser service. In such embodiments, the SaaS applications 310 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 301 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 306) for assessment of its security risk by a web filtering service. For approved URLs, the specialized browser may be permitted to access the link. For suspicious links, however, the web filtering service may have the client interface service 316 send the link to a secure browser service, which may start a new virtual browser session with the client 301, and thus allow the user to access the potentially harmful linked content in a safe environment.

In some embodiments, in addition to or in lieu of providing the user 326 with a list of resources that are available to be accessed individually, as described above, the user 326 may instead be permitted to choose to access a streamlined feed of event notifications and/or available actions that may be taken with respect to events that are automatically detected with respect to one or more of the resources. This streamlined resource activity feed, which may be customized for the user 326, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to an event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 301 to notify a user 326 of something that requires the user's attention (e.g., approval of an expense report, new course available for registration, etc.).

Figure 3C:
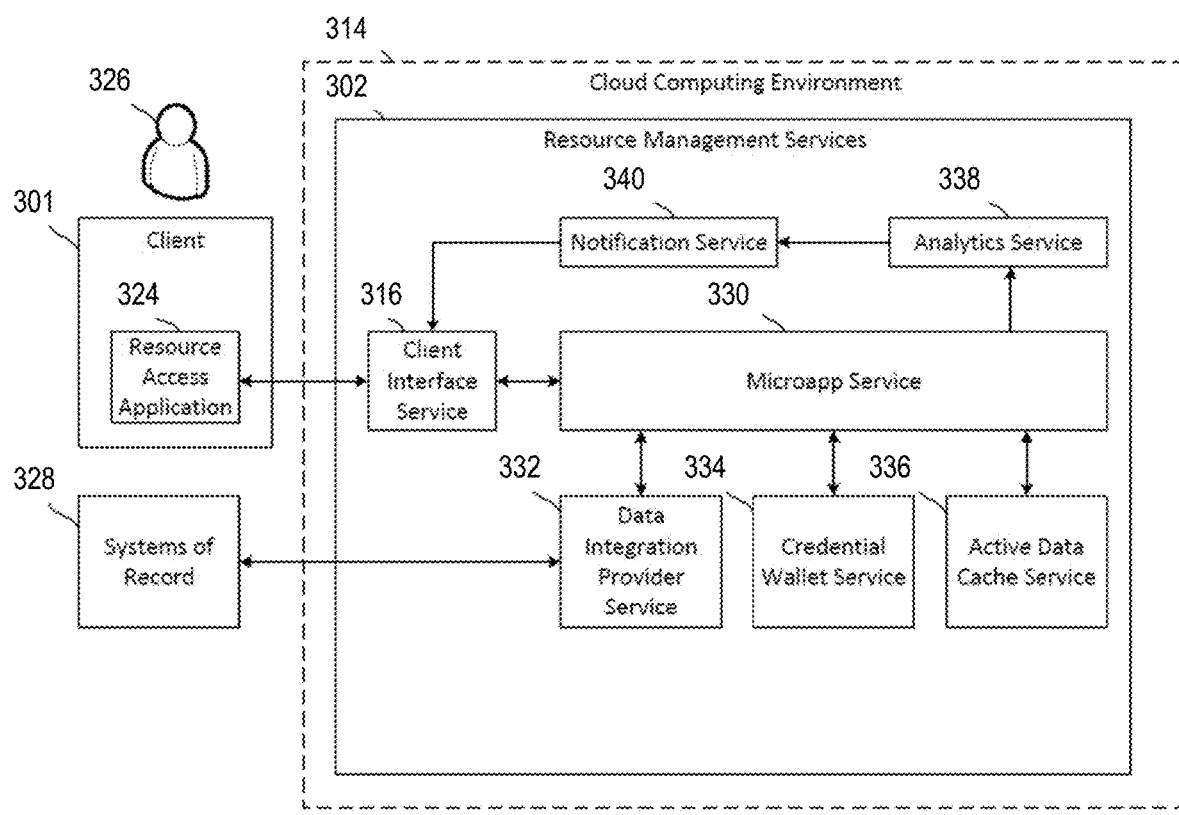
FIG. 3C is a block diagram similar to that shown in FIG. 3B but in which the available resources are represented by a single box labeled "systems of record," and further in which several different services are included among the resource management services.

FIG. 3C is a block diagram similar to that shown in FIG. 3B but in which the available resources (e.g., SaaS applications, web applications, Windows applications, Linux applications, desktops, file repositories and/or file sharing systems, and other data) are represented by a single box 328 labeled "systems of record," and further in which several different services are included within the resource management services block 302. As explained below, the services shown in FIG. 3C may enable the provision of a streamlined resource activity feed and/or notification process for a client 301. In the example shown, in addition to the client interface service 316 discussed above, the illustrated services include a microapp service 330, a data integration provider service 332, a credential wallet service 334, an active data cache service 336, an analytics service 338, and a notification service 340. In various embodiments, the services shown in FIG. 3C may be employed either in addition to or instead of the different services shown in FIG. 3B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 324 without having to launch the native application. The system shown in FIG. 3C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 3C, the systems of record 328 may represent the applications and/or other resources the resource management services 302 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 302, and in particular the data integration provider service 332, may, for example, support REST API, JSON, OData-JSON, and 6ML. As explained in more detail below, the data integration provider service 332 may also write back to the systems of record, for example, using OAuth2 or a service account.

In some embodiments, the microapp service 330 may be a single-tenant service responsible for creating the microapps. The microapp service 330 may send raw events, pulled from the systems of record 328, to the analytics service 338 for processing. The microapp service may, for example, periodically pull active data from the systems of record 328.

In some embodiments, the active data cache service 336 may be single-tenant and may store all configuration information and microapp data. It may, for example, utilize a per-tenant database encryption key and per-tenant database credentials.

In some embodiments, the credential wallet service 334 may store encrypted service credentials for the systems of record 328 and user OAuth2 tokens.

In some embodiments, the data integration provider service 332 may interact with the systems of record 328 to decrypt end-user credentials and write back actions to the systems of record 328 under the identity of the end-user. The write-back actions may, for example, utilize a user's actual account to ensure all actions performed are compliant with data policies of the application or other resource being interacted with.

In some embodiments, the analytics service 338 may process the raw events received from the microapps service 330 to create targeted scored notifications and send such notifications to the notification service 340.

Finally, in some embodiments, the notification service 340 may process any notifications it receives from the analytics service 338. In some implementations, the notification service 340 may store the notifications in a database to be later served in a notification feed. In other embodiments, the notification service 340 may additionally or alternatively send the notifications out immediately to the client 301 as a push notification to the user 326.

In some embodiments, a process for synchronizing with the systems of record 328 and generating notifications may operate as follows. The microapp service 330 may retrieve encrypted service account credentials for the systems of record 328 from the credential wallet service 334 and request a sync with the data integration provider service 332. The data integration provider service 332 may then decrypt the service account credentials and use those credentials to retrieve data from the systems of record 328. The data integration provider service 332 may then stream the retrieved data to the microapp service 330. The microapp service 330 may store the received systems of record data in the active data cache service 336 and also send raw events to the analytics service 338. The analytics service 338 may create targeted scored notifications and send such notifications to the notification service 340. The notification service 340 may store the notifications in a database to be later served in a notification feed and/or may send the notifications out immediately to the client 301 as a push notification to the user 326.

In some embodiments, a process for processing a user-initiated action via a microapp may operate as follows. The client 301 may receive data from the microapp service 330 (via the client interface service 316) to render information corresponding to the microapp. The microapp service 330 may receive data from the active data cache service 336 to support that rendering. The user 326 may invoke an action from the microapp, causing the resource access application 324 to send that action to the microapp service 330 (via the client interface service 316). The microapp service 330 may then retrieve from the credential wallet service 334 an encrypted Oauth2 token for the system of record for which the action is to be invoked, and may send the action to the data integration provider service 332 together with the encrypted Oath2 token. The data integration provider service 332 may then decrypt the Oath2 token and write the action to the appropriate system of record under the identity of the user 326. The data integration provider service 332 may then read back changed data from the written-to system of record and send that changed data to the microapp service 330. The microapp service 332 may then update the active data cache service 336 with the updated data and cause a message to be sent to the resource access application 324 (via the client interface service 316) notifying the user 326 that the action was successfully completed.

In some embodiments, in addition to or in lieu of the functionality described above, the resource management services 302 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 302 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 302 may, for example, parse these requests and respond because they are integrated with multiple systems on the back-end. In some embodiments, users may be able to interact with the virtual assistance through either the resource access application 324 or directly from another resource, such as Microsoft Teams. This feature may allow employees to work efficiently, stay organized, and deliver only the specific information they're looking for.

Resource Allocation

Figure 4:
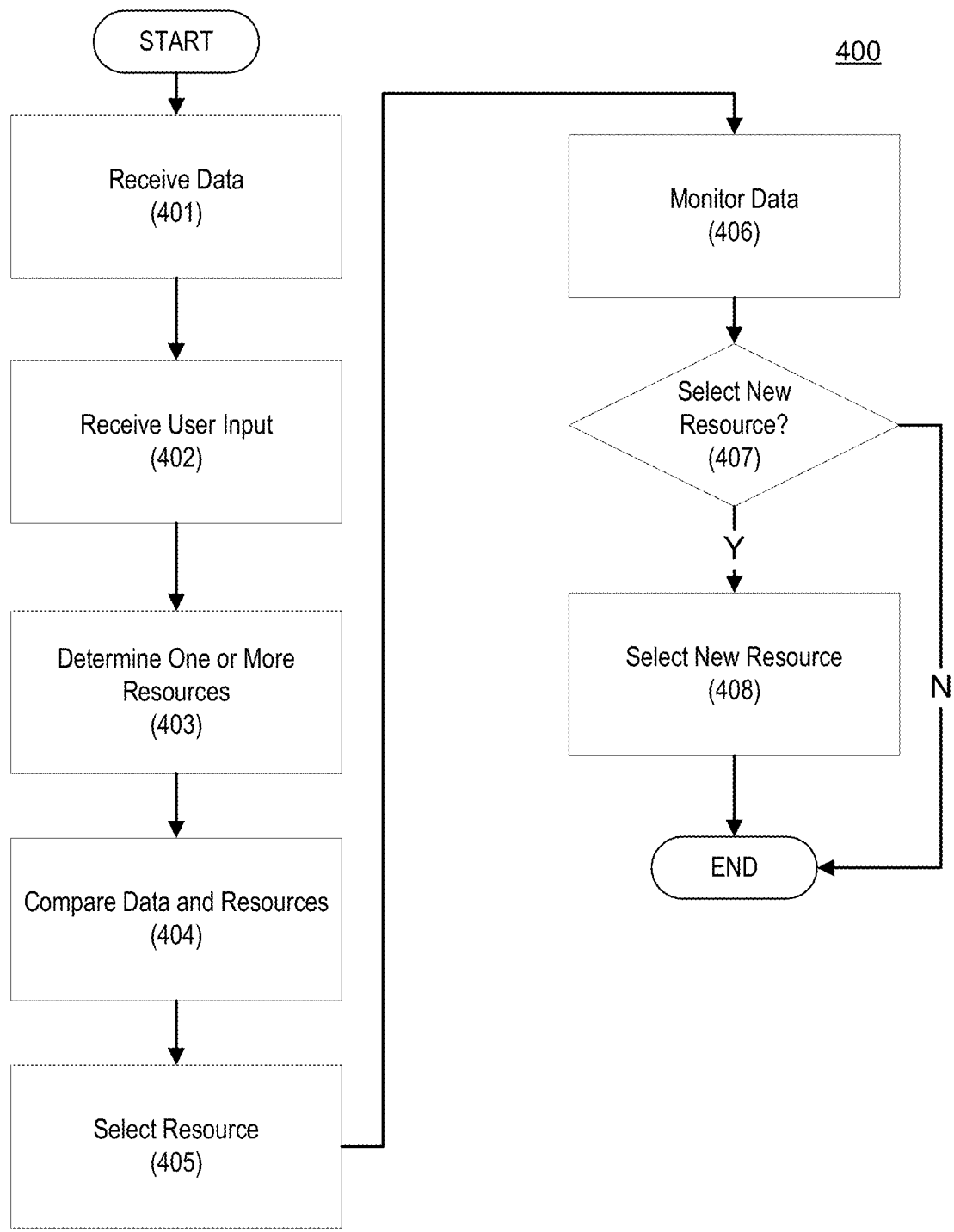
FIG. 4 depicts a flow chart comprising steps for resource allocation.

FIG. 4 depicts a flow chart comprising steps for resource allocation. All or portions of FIG. 4 may be performed by one or more computing devices. All or portions of FIG. 4 may be part of a microapp, such as may be implemented as part of one or more other systems and/or applications.

As a preliminary matter, the one or more resources described herein need not be physical resources. The one or more resources may be, for example, time slots for using physical or digital resources. For example, the one or more resources may comprise time slots for using a remote server farm. As such, the one or more resources may be based on time (e.g., time slots), location (e.g., different physical locations), quantity (e.g., an amount of processing power), or the like. The one or more resources may be limited in that such resources might not be available if in use by one or more other users of the one or more resources. For example, the one or more resources may comprise a communal desktop computer which might only be usable by a single computer at any given time. As another example, the one or more resources may comprise a conference room, and only a certain number of users of the one or more resources may use the conference room at any given time.

In step 401, data (e.g., the data maintained by the systems 201-208 shown in FIG. 2) may be received. For example, the data may comprise data from the calendar system 201 related to the schedule of one or more users of the calendar system 201, building access records from the building access system 202, map data from the location system 203, weather data from the weather system 204, work history data from the personnel system 205, e-mails and chat log data from the messaging system 206, user presence information collected from motion sensors managed by the security system 207, and project status data from the content collaboration system 208. The data from the systems 201-208 may be collected and stored on one or more centralized data stores. The data from the systems 201-208 may be correlated by, e.g., determining common locations and/or users in the data.

The systems 201-208 may be remote from one or more computing devices performing the steps depicted in FIG. 4. As such, receiving the data may comprise requesting, from one or more remote computing devices associated with the systems 201-208, one or more portions of data. Such requests may occur on a periodic basis, and/or may be performed after later steps in FIG. 4 (e.g., after step 402, discussed below).

In step 402, user input may be received via a computing device. The user input may indicate a request from a user, such as a request for access to one or more resources. For example, the user might request access to one or more communal or shared desktop computers at 3:00 PM on a Wednesday. As another example, the user might request a meeting, with two other users, in a conference room on a Friday afternoon. The user input may indicate one or more users of the one or more resources, which need not include the user providing the user input. For example, the input may be provided by a first user and indicate that one or more second users of the one or more resources are to meet in a conference room. The one or more users indicated by the user input may be selected from a list of users, such as a contacts list.

The user input may be associated with use of an application with a user interface. For example, the user input may be provided using a scheduling application comprising a user interface that, when used by a user, allows the user to request a meeting in a certain time period and/or with certain users of one or more resources.

The user input may, but need not, specify one or more dates, times, and/or users of one or more resources. The user input may specify one or more ranges of time and/or one or more users to use one or more resources (e.g., three specific users sometime after 2 PM on Monday). The user input need not be so particularized. For example, if the one or more resources are computing devices and/or conference rooms required for a particular meeting, the user input may specify a need for the computing devices and/or conference rooms during a particular week, but need not comprise a request for a particular computing device and/or conference room. As another example, user input might indicate that at least four users from a particular department in an enterprise should attend a meeting, but need not specify the exact users from the particular department that should attend or the time in which the users should attend the meeting. Such flexibility may advantageously expand the ability of the process to efficiently allocate the one or more resources.

In step 403, one or more resources may be determined. The one or more resources may comprise, for example, time periods during which a tool (e.g., a 3D printer, laboratory equipment) may be used, time periods during which a conference room may be occupied, one or more communal computing devices that are shared by an enterprise, or the like. As such, the one or more resources might relate to a quantity (e.g., of bandwidth), a time period (e.g., during which a conference room may be accessed), or the like. The determinations of the one or more resources may, in some examples, include determining how many of the one or more resources exist. For example, if an enterprise maintains five communal smartphones for group use, then determining the one or more resources may comprise determining how many smartphones are available (e.g., operational and not broken). The determinations of the one or more resources may, in some examples, include the use of periods of time with which something may be used. For example, the one or more resources may comprise one or more periods of time of one or more conference rooms in an office building. As another example, the one or more resources may comprise one or more periods of time during which a 3D printer and/or other laboratory equipment may be used. The one or more resources may be associated with a use schedule, such that the one or more resources may exclude certain times, days, locations, or the like. For example, a 3D printer may be unavailable (e.g., turned off, locked away) during certain hours, and/or may be in use (e.g., occupied, in use by the maximum number of users of the 3D printer) during certain hours.

In step 404, the data and the determined one or more resources may be compared to determine a variety of different ways to allocate the one or more resources. Moreover, by comparing data from a variety of different systems with the determined one or more resources, the one or more resources may be ranked such that the one or more resources may be selected based, at least in part, on the ranking. For example, based on the availability of a variety of different users of the one or more resources (e.g., as determined using one or more calendar applications from the calendar system 201) and the distance of the one or more users from one or more conference rooms during times in which the one or more conference rooms are available (e.g., as determined using data from the location system 203), one or more time slots of the one or more conference rooms may be ranked in terms of convenience to the one or more users.

Comparing the data and the determined time periods may comprise filtering all or portions of the data. For example, schedule data maintained by the calendar system 201 might be filtered based on time periods associated with the one or more resources such that other, potentially irrelevant information (e.g., schedule data from five years ago, schedule data associated with times when the one or more resources are unavailable) is not considered. As another example, personnel data maintained by the personnel system 205 may comprise an indication of a historical availability of one or more users over a wide variety of time periods, and such personnel data may be filtered based on time periods associated with the one or more resources to determine whether the users of the personnel system 205 are likely available during the time periods associated with the one or more resources. As another example, weather data maintained by the weather system 204 may be associated with an entire year, and the weather data may be filtered based on the time periods associated with the one or more resources to determine the projected weather during those time periods.

As part of comparing the data and the one or more resources, locations associated with the one or more resources and anticipated locations of the one or more users may be compared to select one or more resources that are geographically convenient for the one or more users. Anticipated locations of one or more users (also referred to as the predicted locations of the one or more users) may be determined based on, e.g., schedule data stored by the calendar system 201. It may be desirable to select one or more resources that are geographically closest to the anticipated locations of the one or more users, such that the users need not travel far to access the one or more resources. This comparison may be performed to avoid circumstances where a user is undesirably far from a resource. Thus, for example, if the one or more resources comprise one or more 3D printers, the 3D printer closest to the estimated location of all users at a time in which the 3D printer is available may be selected.

The comparison may comprise determining whether the one or more resources can support or otherwise accept a quantity of users associated with the user input. For example, if a user requests a meeting with five other users, then the comparison may comprise determining whether the one or more resources can support six users (e.g., that a conference room has six seats, that a virtual chat room can accommodate six video streams, or the like). The comparison may also comprise determining a percentage of capacity that would be used by one or more users if the one or more users were allocated a resource. For example, providing two users with a conference room meant for fifty people may be wasteful, such that a smaller conference room might be given preference over the large conference room.

As part of comparing the data and the one or more resources, scores may be generated to indicate a degree of preference for the one or more resources. For example, a score may correspond to how convenient a particular 3D printer would be at a particular time and/or date for one or more users. The score may be assigned by a scoring method and/or a machine learning model trained on a history of resource assignments. Such a machine learning model is discussed with more particularity in FIG. 7.

In step 405, a resource of the one or more resources may be selected for use by the user of the client device and the one or more other users. The resource may be selected based on the comparison in step 404. If step 404 comprises ranking the one or more resources (e.g., with a score value) based on the comparison, then the rankings may be weighted and/or summed, and selection of the resource in step 405 may comprise selecting the most highly-ranked resource.

Selecting the resource of the one or more resources may comprise determining that at least one of the one or more users exceed a distance (e.g., a predetermined distance) from the locations associated with a resource. Based on such a determination, users may be provided ways (e.g., teleconferencing, remote access sessions) to remotely access the resource, rather than by physically access the resource. For example, based on a determination that an individual planning to attend a meeting is more than fifty miles away from a conference room, the conference room may be selected, but a virtual meeting session may be generated for that individual to join in lieu of physically attending the meeting.

Selecting the resource may entail use of a machine learning model. The machine learning model may be trained using a history of resource allocations over time, with feedback provided by users to indicate whether the resource allocation was proper. User feedback may be collected from any one of the systems 201-208 and/or another application, such that the machine learning model may be trained over time to improve the decision-making in step 405.

Selecting the resource may comprise generating one or more schedule items and/or reminders for one or more users. As part of selecting the resource, a schedule item may be added to a resource user's schedule, the user may be sent one or more reminders relating to the selection (e.g., reminding the user to be at a certain conference room at a certain time), or the like. For example, if the one or more resources comprise conference rooms, the generated one or more schedule items may comprise an indication of the selected conference room of the one or more conference rooms. The schedule items need not specify the one or more resource. For example, the schedule items might indicate that a resource of the one or more resources has been selected, but not identify with particularity the selected resource until a later time period (e.g., fifteen minutes before a meeting in a conference room begins). In this manner, if changes are made to the schedule items (as discussed below), the update may be made without notification to an individual associated with the schedule item. For example, an individual might be told they should plan to attend a meeting at 2 PM, but not be told where until 15 minutes before the event begins, such that any intervening changes in the meeting location do not affect the individual. The reminders may be transmitted to a smartphone of a user or another computing device associated with the user, such as a computer currently in use by the user.

Selecting the resource may comprise preventing others from accessing the resource. For example, if the selected resource is a period of time between 2 PM and 3 PM and corresponds to a particular 3D printer, the 3D printer may be blocked off (e.g., in a schedule) during that time period. As another example, if the selected resource is a period of time between 2 PM and 3 PM for use of a particular 3D printer, the 3D printer may be password protected such that only users associated with the request may access the printer during that period. Multiple resources (e.g., different time periods, different 3D printers) may be tentatively blocked off as well such that, should the originally selected resource become inconvenient, an alternative remains available.

Selecting the resource may comprise causing display of one or more notifications associated with the selected one or more resources. The notifications may indicate a time, date, and/or location associated with the resource. The notifications may be transmitted to users of the one or more resources (e.g., devices associated with the users) based on user preferences. For example, some notifications may be transmitted to users' smartphones based on determining that those users prefer notifications to be transmitted to their smartphones. The notifications may comprise information about one or more other users. For example, if the notification is a reminder to attend a meeting, the notification may comprise an indication as to whether other users are on their way to a location associated with the meeting.

Selecting the resource may additionally and/or alternatively comprise generating instructions for traveling to a location associated with the selected one or more resources. For example, if the selected one or more locations is a communal or shared computer in a university, then instructions may be generated instructing one or more users of the communal or shared computer (e.g., a student) on how to reach the computer on campus. Such instructions may be displayed on a map, such as an indoor location map managed by the location system 203.

Selecting the resource may comprise causing initialization of a virtual meeting for one or more users of the resource. If the resource (e.g., conference room) selected is too small or otherwise might not be usable by all users, a virtual meeting may be generated such that users can use their computing device to virtually access the meeting. Such a virtual meeting may permit video chat, audio chat, file sharing, and other functionality. The selected resource may be selected based on the availability of a virtual meeting space for some users: for example, if no conference rooms are available which support the number of users requested to attend a meeting, the system may select a conference room and indicate that certain users should attend virtually.

The one or more resources may be selected based on preference data associated with one or more users of one or more resources. The preference data may be based on user preferences as indicated by one or more users and using, e.g., a user interface. For example, users of one or more resources may be periodically queried as to their preferred times and/or locations for meetings (e.g., if the one or more resources are meeting rooms), their preferred types of computing devices (e.g., if the one or more resources are communal computing devices), or the like. User preference data might, for example, be used as a tiebreaker where two of the one or more resources appear otherwise equal.

The one or more resources may be selected based on determining that it is in a convenient location for one or more users of the resource. For example, for a meeting with three users, a resource (e.g., conference room) may be selected having the closest walking distance for all users. As another example, for the same meeting, a resource (e.g., a conference room) may be selected having sufficient space such that all users may occupy the space at the same time. As another example, a resource (e.g., a conference room) may be selected based on determining that it has sufficient capabilities (e.g., whiteboards) for the needs of one or more users.

The one or more resources may be selected such that the resource that is selected is based on the behavioral patterns of one or more users of the one or more resources. The behavioral pattern may indicate, for example, a convenient and/or regularly free time of day for one or more users, which type(s) of the one or more resources one or more users prefers, or the like. For example, a resource (e.g., a 3D printer) may be selected based on knowing that users requesting the resource prefer a resource during a particular time of day or in a particular location of the building.

An example of a resource selection of conference rooms is provided herein. In this example, three attendees may request a sixty-minute meeting in any conference room in a building. As such, the one or more resources in this example are the one or more periods of time available in one or more conference rooms in the building. As part of step 403, these one or more resources (e.g., available timeslots in the conference rooms) may have been determined. In step 404, the data (e.g., context data, such as the schedules of the users as determined using the calendar system 201) may have been compared to the one or more resources to determine which of the one or more resources might be used by the users (e.g., time slots/conference rooms where the users do not have scheduling conflicts). In step 405, the system may begin by determining a plurality of distance scores. These distance scores may indicate a degree of convenience, for one or more of the users, of locations associated with particular resources. Examples of such values are shown below in Table 1.

TABLE 1

| Resource | Attendee 1 | Attendee 2 | Attendee 3 |
| --- | --- | --- | --- |
| 2 PM-3 PM, Conference Room A | 3 | 1 | 2 |
| 2 PM-3 PM, Conference Room B | 2 | 2 | 3 |
| 3 PM-4 PM, Conference Room C | 1 | 3 | 1 |
| 4 PM-5 PM, Conference Room A | 3 | 1 | 2 |

In Table 1, larger values in a column for a user indicate greater convenience for the user, whereas smaller values indicate less convenience for the user. Then, the system may assign capacity/utilization scores based on the most efficient use of space. This may be determined by dividing the number of attendees by the capacity of the room. Examples of such calculations are shown in Table 2.

TABLE 2

| Location | Room Capacity/Utilization score |
| --- | --- |
| Conference Room A (5 Person Capacity) | 3/5 = 60% |
| Conference Room B (10 Person Capacity) | 3/10 = 30% |
| Conference Room C (10 Person Capacity) | 3/10 = 30% |

Then, the system may assign preference scores based on users' preference for certain times of day. This is shown below in Table 3.

TABLE 3

| Time Slot | Attendee 1 | Attendee 2 | Attendee 3 |
| --- | --- | --- | --- |
| 2 PM-3 PM | 3 | 1 | 1 |
| 3 PM-4 PM | 2 | 2 | 3 |
| 4 PM-5 PM | 1 | 3 | 2 |

In Table 3, higher values indicate greater user preference. Then, the system may use weights $W_1$, $W_2$, $W_3$ (which, e.g., may be selected by an administrator based on the subjective importance of the different values above) and sum the scores using the following equation:

$$\text{Score}(x) = W_1 \Sigma \text{DistanceScores}_x + W_2 \Sigma \text{UtilizationScores}_x + W_3 \Sigma \text{TimeslotScore}_x$$

The result may indicate scores for the one or more resources. Such scores are shown below in Table 4.

TABLE 4

| Resource | Score |
| --- | --- |
| 2 PM-3 PM, Conference Room A | 87 |
| 2 PM-3 PM, Conference Room B | 65 |
| 3 PM-4 PM, Conference Room C | 58 |
| 4 PM-5 PM, Conference Room A | 87 |

Thus, in this example, either Timeslot 1, Conference Room 1 or Timeslot 3, Conference Room 1 may be selected. This tie might be broken by selecting, for example, the least-used conference room, the earliest timeslot, and/or by random selection.

In step 406, the data (e.g., from the systems 201-208) may be monitored to determine whether any changes have been made to the data. The data may be updated and/or otherwise changed over time, and monitoring the data may comprise determining one or more changes to one or more portions of data (e.g., the schedule data) associated with the selection of the resource in step 405. For example, monitoring the data may comprise determining, using the personnel system 205, that a particular attendee of a planned event is unexpectedly sick and likely unable to attend the event. As another example, monitoring the data may comprise determining, using the building access system 202 and/or the personnel system 205, that a particular user is unexpectedly working remotely due to a family emergency and thus unlikely to physically attend a meeting in a conference room.

Monitoring the data may comprise querying (e.g., periodically querying) devices to receive new versions of the data. This may comprise determining instances in which the selected resource is now undesirable. For example, monitoring the data may comprise detecting a change to the data by querying a device (e.g., a device storing schedule information for one or more users as part of the calendar system 201), receiving a current location of one or more users of the device (e.g., as indicated by a location of an event that the user is predicted to be currently attending), and determining that the current distance of the user is a distance away from a location associated with a selected resource. In other words, in that example, the user is unexpectedly too far away to be able to access the resource.

Monitoring the data may comprise comparing different copies of the data. A first version of the data (e.g., the schedule data and the location data) may be stored. A second version of the data may later be retrieved. The first data and the second data may be compared to determine one or more changes. Based on this comparing, an impact to the one or more resources may be determined.

Monitoring the data may comprise determining an impact, by the change, to the assignment of the one or more resources. In this manner, it may be determined whether the change might suggest re-assignment of one or more resources. For example, if a calendar invite is generated after selecting a conference room in step 405, then detecting a change in the data may comprise determining whether the change has any effect on the calendar invite (e.g., if a 3D printer is now inadvertently double-booked).

Monitoring the data may comprise determining the occurrence of a number of events which may impact the ability of one or more users to access the selected one or more resources. For example, if the one or more resources is a conference room, a previous meeting may run long (as evidenced by motion detected by sensors of the security system 207) such that the conference room might no longer be available for use at a requested time. As such, the change need not be limited to data involving the users associated with the selected resource, but might include changes relating to the data of other users.

In step 407, it is determined whether selection of a new resource may be appropriate based on, for example, whether a change exists in the data. The change may be determined by comparing an older copy of the data with a newer copy of the data and determining that one or more portions of the older copy differ from the newer copy. The change may be determined by determining the presence of an entry in a changelog associated with the data. The change may be determined by receiving, from a computing device changing the data, an indicating that a change to the data is being made. If there is a change, the flow chart proceeds to step 408. Otherwise, the flow chart ends.

Additionally and/or alternatively, step 407 may comprise determining that a particular period of time, e.g., a period of time elapsing, a particular time before a requested time period, or the like, has elapsed. For example, the user input in step 402 may request a resource at 5:00 PM, and step 407 may comprise a determination that there is less than one hour before 5:00 PM. In this manner, the system need not determine that the data monitored in step 406 has changed relative to the data received in step 401, but may instead dynamically re-allocate resources to most optimally allocate resources given the latest set of data available. Part of this re-allocation may be part of a "deferred" or "soft" booking system, as detailed further below.

In step 408, a new resource may be selected. The process for determining a new resource may be the same or different as performed in step 405. For example, the new data (with the one or more changes) may be compared with the periods, and, based on that comparison, the new resource may be selected, and steps performed during selection of the original resource (e.g., generating the notification) may be repeated to reflect the change. As another example, selecting the new resource may comprise generating a new schedule item comprising a new location and/or a new time. In such an example, once a new location and/or a new time are selected, a schedule of a plurality of users may be modified to include the new schedule item indicating the new location and/or the new time.

Selecting the new resource may comprise generating a change notification. Generating a change notification may comprise generating an e-mail, text message, or other similar message that indicates the new resource. The change notification may be sent to one or more users and may indicate, for example, a change in a location, time, date, and/or other information associated with the selected new resource.

Selecting the new resource may comprise modifying data associated with the new resource. For example, if a calendar item (e.g., an appointment in a calendar application that is part of the calendar system 201) was generated as part of selecting an original resource, the calendar item may be modified to reflect the new resource. In this manner, users need not manually amend the data themselves.

Similarly, selecting the new resource may comprise generating a virtual meeting session for one or more users, thereby permitting users that might not be able to physically access the resource to participate remotely. The virtual meeting space may comprise, for example, a scheduled session in a video and/or audio conferencing application. For example, for a meeting with four users, three may be capable of attending physically, but one may be unable to attend physically. Based on determining that the one user may be unable to attend physically, a virtual meeting session may be generated such that the three users may (e.g., using a computing device located in a conference room) video and/or audio conference with the remote user. Generating the virtual meeting session may comprise determining a code and/or password which may be used by the one or more users to access the session.

The virtual meeting space may comprise an area in a workspace application and/or client application where one or more users may virtually meet. For example, the virtual meeting space may permit users of the virtual meeting space to share video and/or audio and thereby conduct a video and/or audio conference. The virtual meeting space may comprise an indication of a live status of one or more attendees and/or organizers of the meeting. The live status may comprise, for example, a location of one or more of the users, a status (e.g., online, away from keyboard) of one or more of the users, and/or information about the manner in which the user is connected to the virtual meeting space (e.g., via a laptop, smartphone, or the like). In this manner, an organizer of the meeting need not check in with each user (e.g., pinging them via e-mail to remind them to attend a virtual meeting, to use a certain device to attend the virtual meeting, or the like), but might instead be provided such information via the application providing the virtual meeting. The virtual meeting space may additionally and/or alternatively provide users the ability to create and/or respond to a poll and/or survey. For example, one user may poll other users via the virtual meeting space. The virtual meeting space may provide users the ability to share content via the virtual meeting space. For example, one user may send, to one or more users in the meeting, a document or other digital file. As another example, a user may share their screen in the virtual meeting. The shared content need not be shared during the virtual meeting. For example, as part of selecting the resource, documents may be provided to a virtual meeting space. In this manner, the virtual meeting space may be preloaded with content (e.g., documents) that may be used during the virtual meeting.

As an example of a virtual meeting space, selecting the new resource may comprise determining that one or more users of the resource are unable to physically access the resource. For example, the resource may be a conference room at a particular time, and one or more users may be located far away from the conference room. As part of selecting the new resource, a virtual meeting space may be instantiated. The virtual meeting space may comprise one or more files for use during the meeting and/or one or more polls for use during the meeting. The virtual meeting space may be configured such that one or more computing devices (e.g., users' smartphones, a computing device located in the conference room) may access the virtual meeting space. For example, the virtual meeting space may be configured such that users physically located in the conference room may join the virtual meeting space using a computer located in the conference room, whereas users not physically located in the conference room may join the virtual meeting space using different computing devices.

Selecting the new resource may advantageously avoid circumstances where there is uncertainty as to whether users of a resource may use the resource. For example, if the one or more resources are particularly in-demand (e.g., time slots for laboratory equipment used by a variety of university students), idle time for the resource may be undesirable. By detecting changes in data which may evince a circumstance where the one or more resources might not be used by one or more users, the process may reassign those users (e.g., to a different day, time, or resource) and thereby free the previously-assigned resource to one or more other users.

An example of steps 406-408 is provided herein. User A and User B have been, through steps 401-405, been allocated a resource (e.g., the time period 4 PM to 5 PM in Conference Room A). Personnel data stored by the personnel system 205 may indicate that meetings between these users usually run overtime. Newly-received weather data stored by the weather system 204 may indicate that it will rain from 3 PM to 5 PM, such that User B might arrive late to the meeting because of rain-related traffic. The steps in 406-408 might, recognizing the newly-received weather data reassign User A and User B a slightly different resource: the time period from 4 PM to 6 PM in Conference Room B.

The process described in FIG. 4 may be used to implement a deferred booking system. The selection of the resource in step 405 may be a soft or deferred selection, such that one or more resources are not definitively and/or permanently reserved and thereby held to the exclusion of other users. For example, the selection of the resource in step 405 may comprise determining that two users might plan to meet using one of any number of different conference rooms in a broad range of time, such that selecting the resource may be a soft, non-definitive selection of a plurality of resources. In that example, each of the different resources (e.g., each different conference room) may be noted as potentially being reserved (e.g., in a particular time period, by particular users, etc.). Such a soft selection need not be specific: for example, the time period may be a block of several hours during which users might potentially use the resource. As part of monitoring the data in step 406, additional soft/deferred bookings of the same conference rooms may be received. For example, a different collection of three users might plan to meet using any one of the different conference rooms in the same particular broad range of time. Before the time period(s) requested (e.g., a day before the broad range of time and/or some other time before the broad range of time), step 407 and 408 may be performed, such that each of the groups of users may be assigned a formal, hard selection of one or more of the resources. In other words, using a better, more up-to-date picture of data relevant to the allocation of one or more resources (e.g., whether the users might be working from home or otherwise unavailable, whether the resource is still desired, whether more or fewer users are anticipated to use the resource, whether the resources are broken or otherwise disabled), resources may be allocated. While the groups of users might not necessarily receive an indication of their meeting time/location before such a "hard" selection is made, this may advantageously allow for the most optimal allocation of resources, particularly where such resources are highly in-demand.

Figure 5:
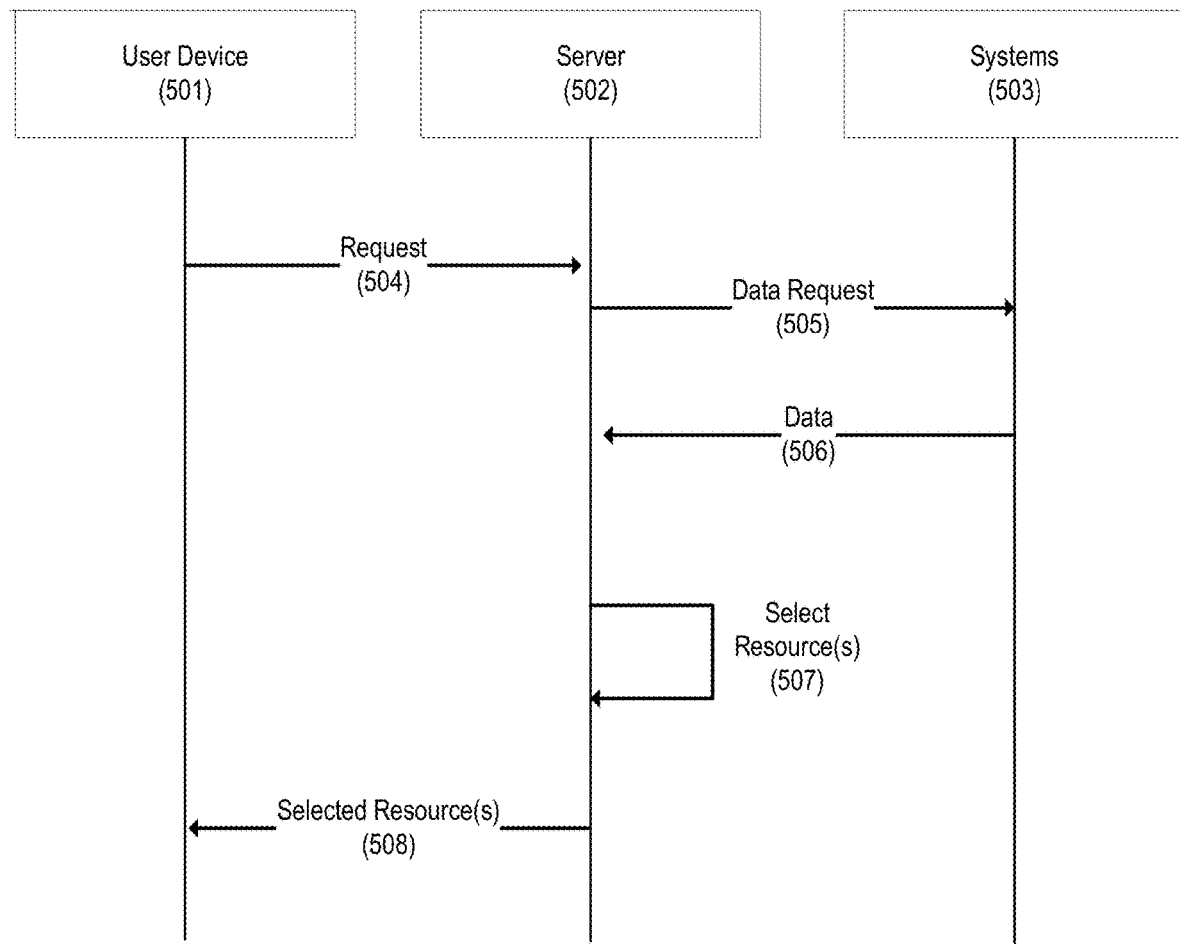
FIG. 5 shows a message flow diagram between a user device, an engine, and a plurality of systems.

FIG. 5 shows a message flow diagram between a user device 501, a server 502, and systems 503. The user device 501 may be any computing device used by a user. The server 502 may perform all or some of the steps depicted in FIG. 4. The systems 503 may be the same or similar to the systems 201-208 shown in FIG. 2. Request 504 is a request from the user device 501 to the server 502. The request may be the same or similar as the user input described in step 402 of FIG. 4. As indicated with respect to step 402, the request may comprise a request for one or more resources and may be associated with one or more users. For example, the request 504 may be a request, by a user, to create an in-person meeting invite. Data request 505 is a request, from the server 502 and to the systems 503, for data. This request may be part of step 401 in FIG. 4. Unlike FIG. 4, as shown in FIG. 5, the request for data is sent after the request is received by the server 502. In this manner, the request for data might indicate information about the request, such as an identity of the one or more users associated with the request. Response 506 is the data and is sent from the systems 503 to the server 502. The data may be the same or similar as discussed with respect to FIG. 2 and with respect to step 401 of FIG. 4. In step 507, the server 502 may select a resource from the one or more resources. This may comprise all or portions of steps 403-405 of FIG. 4. In message 508, an indication of the selected resources is sent to the user device 501.

Figure 6:
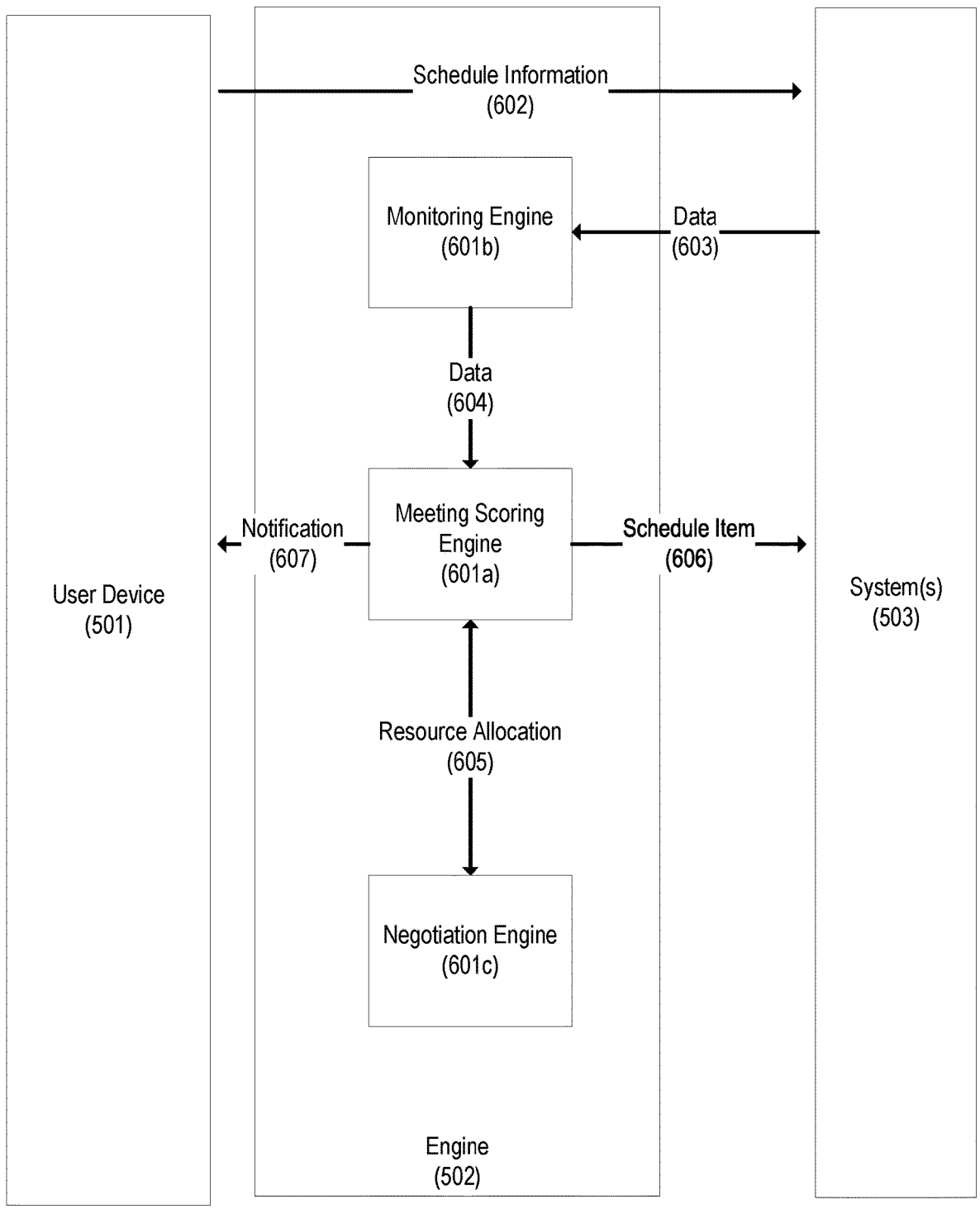
FIG. 6 shows a message flow diagram between a user device, an engine comprising various components, and a plurality of systems.

FIG. 6 shows a message flow diagram between the user device 501, the server 502, and systems 503 (which may, e.g., include the location system 203, the content collaboration system 208, and the personnel system 205). The server 502 is shown as comprising three different elements: a meeting scoring engine 601*a*, a monitoring engine 601*b*, and a negotiation engine 601*c*. These elements are illustrative, and the server 502 may be configured in any manner desired. The flow depicted in FIG. 6 may be performed in a manner similar to the steps depicted in FIG. 4 and/or the messages depicted in FIG. 5. The arrows shown in FIG. 6 need not represent transmission in any particular order or manner. For example, the calendar system 201 may send data 603*d* to the monitoring engine 601*b* before the user device 601 sends schedule information 602 to the personnel system 205.

The user device 501 may send schedule information 602 to the personnel system 205. The schedule information 602 may be information about the schedule of a user, such as various indications of when the user is busy, available, or the like. The personnel system 205 may send data 603, which may include all or portions of the schedule information 602, to the monitoring engine 601*b*. The data 603 may additionally and/or alternatively comprise information from the content collaboration system 208, the location system 203, a calendar system, or the like. The monitoring engine 601*b* may thereby perform steps such as steps 401 and 406 of FIG. 4. The monitoring engine 601*b* may send all or portions of received data, as data 604, to the meeting scoring engine 601*a*. The meeting scoring engine 601*a* may collaborate with the negotiation engine 601*c* to perform resource allocation 605. The meeting scoring engine 601*a* and/or the negotiation engine 601*c* may perform steps such as 403-405 and/or 407-408 of FIG. 4. For example, the negotiation engine 601*c* may comprise one or more machine learning models, trained on data such as resource allocation data, configured to use the data 604 to make a resource allocation 605 determination. The meeting scoring engine 601*a* may then send a schedule item 606 to the calendar system 201 for inclusion in one or more schedules of one or more users. The meeting scoring engine 601*a* may also send a notification 607 relating to the allocation to the user device 601.

Figure 7:
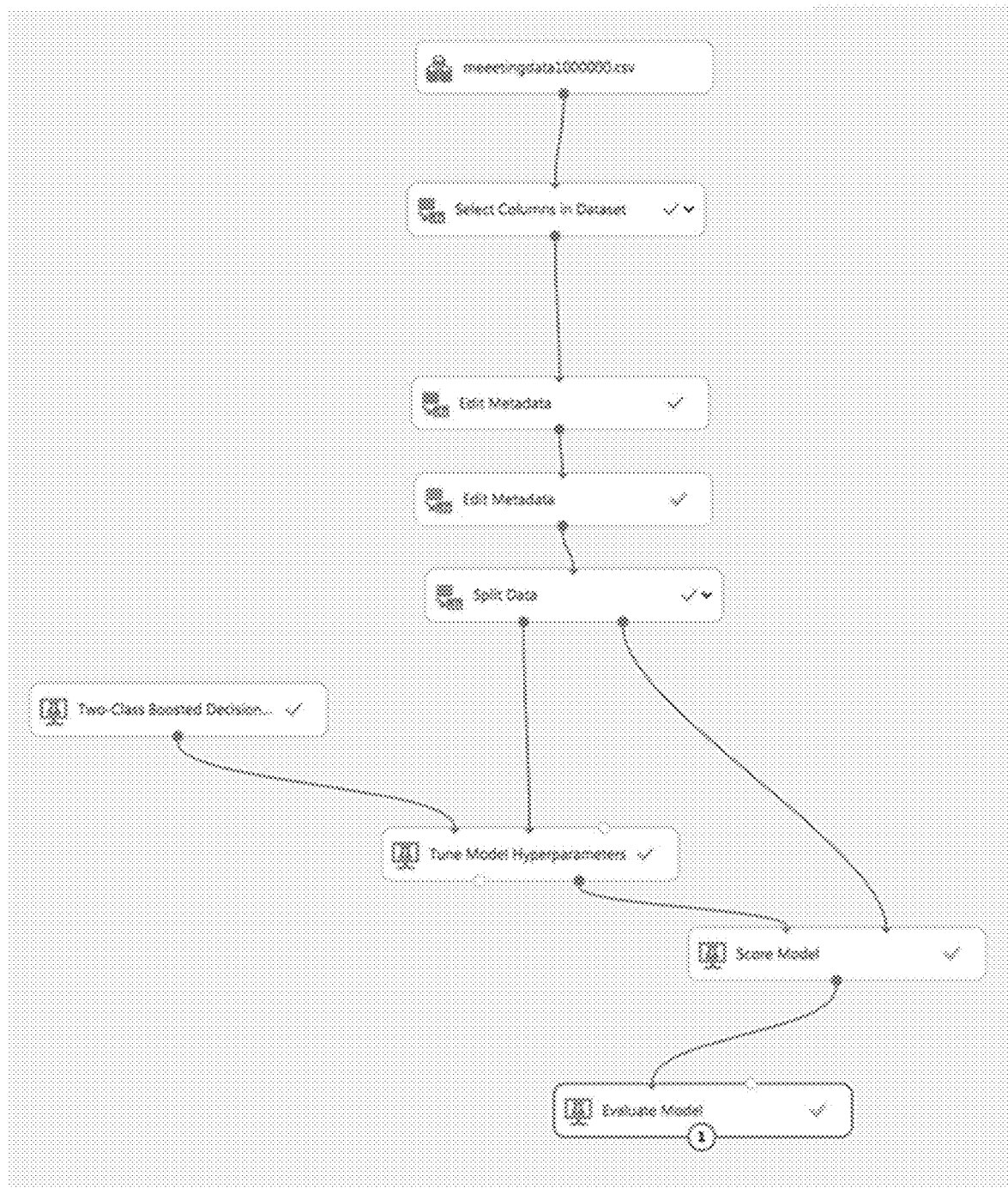
FIG. 7 shows an illustrative diagram of a machine learning model which may be implemented for resource allocation.

FIG. 7 shows an illustrative diagram of a machine learning model, such as may be implemented for resource allocation. Machine learning models may be used in any step of the process described herein. With particular reference to the selection of a resource of one or more resources (e.g., step 405), at least two approaches for implementing machine learning models may be used. In one approach, a machine learning model may be trained to accept or reject user input as a binary classification problem. In such an approach, the model may use counts modules to generate features from columns of categorical values. In a second approach, a binary classification method, such as a two-class boosted decision tree, may be used without using a learning by count method. This second approach is depicted in FIG. 7.

An example of how such a machine learning model may be implemented with respect to predicting whether a user will accept or reject a meeting is provided herein. Data used by the machine learning model may comprise a series of variables, such as an identification of a user, an identity of an event organizer, an indication of a day of the week, an indication of a meeting time, an indication of a meeting duration, and an indication of whether the meeting is original (in contrast with, for example, rescheduled, recurring, or the like). The data may also comprise a Boolean indication of whether a user has accepted the meeting or not. This meeting may be combined with other contextual data, such as weather data, using any appropriate machine learning method. A learning by count method may be used, wherein the data may be grouped into bins. For example, an Entropy MDL binning mode may be used. A Build Counting Transform step may then be performed on the bins, and the parameters for this step may be tweaked as desired. Using these or similar steps (e.g., a two class boosted decision algorithm or other machine learning algorithm), the machine learning model may be trained using the aforementioned data to predict whether a user may accept or reject a meeting.

The following paragraphs (M1) through (M14) describe examples of methods that may be implemented in accordance with the present disclosure.

(M1) A method comprising identifying, by a computing device and based on inputs received by a user and via the computing device, a plurality of periods of time in which to access one or more resources, wherein the inputs indicate a range of time in which to use the one or more resources; receiving, by the computing device, data, from at least one remote application, indicative of locations of one or more users of the one or more resources over one or more time periods, and wherein the at least one remote application is an application other than a calendar application; determining, by the computing device and based on the received data, one or more anticipated locations of the one or more users within the range of time; generating, by the computing device and based on a geographic distance between the one or more anticipated locations and one or more locations of the one or more resources, individual scores for the one or more users; and selecting, by the computing device and based on the individual scores for the one or more users, a resource from the one or more resources.

(M2) A method may be performed as described in paragraph (M1), wherein generating the individual scores is further based on schedule data, associated with the calendar application, that indicates schedules of the one or more users over the range of time.

(M3) A method may be performed as described in paragraph (M1), further comprising receiving, by the computing device and from a second remote application different from the remote application, personnel data comprising an indication of a historical availability of the one or more users, wherein generating the individual scores is further based on the personnel data.

(M4) A method may be performed as described in paragraph (M1), further comprising receiving, by the computing device and from a second remote application different from the calendar application, weather data that indicates anticipated weather associated with the range of time, wherein generating the individual scores is further based on the weather data.

(M5) A method may be performed as described in paragraph (M1), wherein selecting the resource is based on determining that at least one of the one or more users are a predetermined distance from the one or more locations of the one or more resources.

(M6) A method may be performed as described in paragraph (M1), further comprising detecting a change to the data; and selecting, based on the change to the data and from the one or more resources, a second resource.

(M7) A method may be performed as described in paragraph (M1), wherein the detecting the change to the data comprises: querying a device associated with at least one of the one or more users; receiving, from the device, a current location of the at least one of the one or more users; and determining, based on the current location, that the at least one of the one or more users is greater than a predetermined distance from a first location associated with the resource.

(M8) A method may be performed as described in paragraph (M1), wherein the remote application comprises a building access system, and wherein the one or more anticipated locations of the one or more users are based on access, by at least one of the one or more users, to one or more locations associated with the building access system.

(M9) A method may be performed as described in paragraph (M1), wherein the one or more resources comprise one or more meeting rooms, and wherein selecting the resource comprises comparing a count of the one or more users to occupancy limits of the one or more meeting rooms.

(M10) A method comprising remote application is an application other than a calendar application; determining, by the computing device and based on the data, a change to a schedule item, wherein the schedule item corresponds to a planned meeting of the plurality of users at a first location; generating, by the computing device and based on the change in the schedule item, a plurality of updated schedule items, wherein the plurality of updated schedule items correspond to one or more second locations different from the first location; determining, by the computing device and based on the data, one or more anticipated locations of the plurality of users during one or more time periods corresponding to the plurality of updated schedule items; transmitting, by the computing device and to user devices associated with the plurality of users, one or more indications of the plurality of updated schedule items; receiving, by the computing device and from the user devices, preference data indicating at least one of the plurality of updated schedule items; generating, by the computing device, based on the preference data, and based on a geographic distance between the one or more anticipated locations and one or more locations associated with the plurality of updated schedule items, individual scores for the plurality of users; and modifying, by the computing device and based on the individual scores for the plurality of users, schedules of the plurality of users using one of the plurality of updated schedule items.

(M11) A method may be performed as described in paragraph (M10), wherein the preference data indicates, for at least one of the plurality of updated schedule items, a degree of preference.

(M12) A method may be performed as described in paragraph (M10), wherein determining the change to the schedule item comprises: storing a first version of the data; retrieving a second version of the data; and comparing the first version of the data with the second version of the data.

(M13) A method may be performed as described in paragraph (M10), wherein generating the individual scores comprises: determining, based on the preference data, the at least one of the plurality of updated schedule items corresponding to a greatest degree of preference.

(M14) A method may be performed as described in paragraph (M10), further comprising determining, by the computing device and based on the preference data, a second plurality of updated schedule items, wherein modifying the schedules is further based on the second plurality of updated schedule items.

The following paragraphs (A1) through (A14) describe examples of apparatuses that may be implemented in accordance with the present disclosure.

(A1) An apparatus comprising one or more processors and memory storing instructions that, when executed by the one or more processors, cause the apparatus to identify, based on inputs received by a user, a plurality of periods of time in which to access one or more resources, wherein the inputs indicate a range of time in which to use the one or more resources; receive data, from at least one remote application, indicative of locations of one or more users of the one or more resources over one or more time periods, and wherein the at least one remote application is an application other than a calendar application; determine, based on the received data, one or more anticipated locations of the one or more users within the range of time; generate, based on a geographic distance between the one or more anticipated locations and one or more locations of the one or more resources, individual scores for the one or more users; and select, based on the individual scores for the one or more users, a resource from the one or more resources.

(A2) An apparatus as described in paragraph (A1), wherein the instructions, when executed by the one or more processors, cause the apparatus to generate the individual scores further based on schedule data, associated with a calendar application, that indicates schedules of the one or more users over the range of time.

(A3) An apparatus as described in paragraph (A1) or (A2), wherein the instructions, when executed by the one or more processors, cause the apparatus to receive, from a second remote application different from the remote application, personnel data comprising an indication of a historical availability of the one or more users, wherein the instructions, when executed by the one or more processors, cause the apparatus to generate the individual scores further based on the personnel data.

(A4) An apparatus as described in any one of paragraphs (A1)-(A3), wherein the instructions, when executed by the one or more processors, cause the apparatus to receive, from a second remote application different from the calendar application, weather data that indicates anticipated weather associated with the range of time, wherein the instructions, when executed by the one or more processors, cause the apparatus to generate the individual scores further based on the weather data.

(A5) An apparatus as described in any one of paragraphs (A1)-(A4), wherein the instructions, when executed by the one or more processors, cause the apparatus to select the resource based on determining that at least one of the one or more users are a predetermined distance from the one or more locations of the one or more resources.

(A6) An apparatus as described in any one of paragraphs (A1)-(A5), wherein the instructions, when executed by the one or more processors, cause the apparatus to detect a change to the data; and select, based on the change to the data and from the one or more resources, a second resource.

(A7) An apparatus as described in any one of paragraphs (A1)-(A6), wherein the instructions, when executed by the one or more processors, cause the apparatus to detect the change to the data by: querying a device associated with at least one of the one or more users; receiving, from the device, a current location of the at least one of the one or more users; and determining, based on the current location, that the at least one of the one or more users is greater than a predetermined distance from a first location associated with the resource.

(A8) An apparatus as described in any one of paragraphs (A1)-(A7), wherein the remote application comprises a building access system, and wherein the one or more anticipated locations of the one or more users are based on access, by at least one of the one or more users, to one or more locations associated with the building access system.

(A9) An apparatus as described in any one of paragraphs (A1)-(A8), wherein the one or more resources comprise one or more meeting rooms, and wherein the instructions, when executed by the one or more processors, cause the apparatus to select the resource by comparing a count of the one or more users to occupancy limits of the one or more meeting rooms.

(A10) An apparatus comprising one or more processors and memory storing instructions that, when executed by the one or more processors, cause the apparatus to receive data, from at least one remote application, indicative of locations of a plurality of users of the at least one remote application over one or more time periods, and wherein the at least one remote application is an application other than a calendar application; determine, based on the data, a change to a schedule item, wherein the schedule item corresponds to a planned meeting of the plurality of users at a first location; generate, based on the change in the schedule item, a plurality of updated schedule items, wherein the plurality of updated schedule items correspond to one or more second locations different from the first location; determine, based on the data, one or more anticipated locations of the plurality of users during one or more time periods corresponding to the plurality of updated schedule items; transmit, to user devices associated with the plurality of users, one or more indications of the plurality of updated schedule items; receive, from the user devices, preference data indicating at least one of the plurality of updated schedule items; generate, based on the preference data and based on a geographic distance between the one or more anticipated locations and one or more locations associated with the plurality of updated schedule items, individual scores for the plurality of users; and modify, based on the individual scores for the plurality of users, schedules of the plurality of users using one of the plurality of updated schedule items.

(A11) An apparatus as described in paragraph (A10), wherein the preference data indicates, for at least one of the plurality of updated schedule items, a degree of preference.

(A12) An apparatus as described in paragraph (A10) or (A11), wherein the instructions, when executed by the one or more processors, cause the apparatus to determine the change to the schedule item by: storing a first version of the data; retrieving a second version of the data; and comparing the first version of the data with the second version of the data.

(A13) An apparatus as described in any one of paragraphs (A10)-(A12), wherein the instructions, when executed by the one or more processors, cause the apparatus to generate the individual scores by: determining, based on the preference data, the at least one of the plurality of updated schedule items corresponding to a greatest degree of preference.

(A14) An apparatus as described in any one of paragraphs (A10)-(A13), wherein the instructions, when executed by the one or more processors, cause the apparatus to determine, based on the preference data, a second plurality of updated schedule items, wherein the instructions, when executed by the one or more processors, cause the apparatus to modify the schedules further based on the second plurality of updated schedule items.

The following paragraphs (S1) through (S6) describe examples of systems that may be implemented in accordance with the present disclosure.

(S1) A system comprising a first computing device; and a second computing device; wherein the first computing device comprises: one or more first processors; and first memory storing first instructions that, when executed by the one or more first processors, cause the first computing device to: store data associated with at least one application that indicates locations of one or more users of the at least one application over one or more time periods, wherein the at least one application is an application other than a calendar application; and send, to the second computing device and via a network, the data; wherein the second computing device comprises: one or more second processors; and second memory storing second instructions that, when executed by the one or more second processors, cause the second computing device to: receive user input indicating a range of time in which to use one or more resources; receive, via the network, the data; determine, based on the data, one or more anticipated locations of the one or more users within the range of time; generate, based on a geographic distance between the one or more anticipated locations and one or more locations of the one or more resources, individual scores for the one or more users; and select, based on the individual scores for the one or more users, a resource from the one or more resources.

(S2) A system as described in paragraph (S1), wherein the second memory, when executed by the one or more second processors, causes the second computing device to generate the individual scores further based on schedule data, associated with a calendar application, that indicates schedules of the one or more users over the range of time.

(S3) A system as described in paragraph (S1), wherein the second memory, when executed by the one or more second processors, causes the second computing device to: receive, from a second remote application different from the at least one application, personnel data comprising an indication of a historical availability of the one or more users, wherein the second memory, when executed by the one or more second processors, causes the second computing device to generate the individual scores further based on the personnel data.

(S4) A system as described in paragraph (S1), wherein the second memory, when executed by the one or more second processors, causes the second computing device to: receive, from a second remote application different from the at least one application, weather data that indicates anticipated weather associated with the range of time, wherein the second memory, when executed by the one or more second processors, causes the second computing device to generate the individual scores further based on the weather data.

(S5) A system as described in paragraph (S1), wherein the second memory, when executed by the one or more second processors, causes the second computing device to select the resource further based on determining that at least one of the one or more users are a predetermined distance from the one or more locations of the one or more resources.

(S6) A system as described in paragraph (S1), wherein the second memory, when executed by the one or more second processors, causes the second computing device to: detect a change to the data; and select, based on the change to the data and from the one or more resources, a second resource.

(S7) A system comprising a first computing device; and a second computing device; wherein the first computing device comprises: one or more first processors; and first memory storing first instructions that, when executed by the one or more first processors, cause the first computing device to: receive data, from at least one remote application, indicative of locations of a plurality of users of the at least one remote application over one or more time periods, and wherein the at least one remote application is an application other than a calendar application; determine, based on the data, a change to a schedule item, wherein the schedule item corresponds to a planned meeting of the plurality of users at a first location; generate, based on the change in the schedule item, a plurality of updated schedule items, wherein the plurality of updated schedule items correspond to one or more second locations different from the first location; determine, based on the data, one or more anticipated locations of the plurality of users during one or more time periods corresponding to the plurality of updated schedule items; transmit, to user devices associated with the plurality of users, one or more indications of the plurality of updated schedule items; receive, from the user devices, preference data indicating at least one of the plurality of updated schedule items; generate, based on the preference data and based on a geographic distance between the one or more anticipated locations and one or more locations associated with the plurality of updated schedule items, individual scores for the plurality of users; and modify, based on the individual scores for the plurality of users, schedules of the plurality of users using one of the plurality of updated schedule items; and wherein the second computing device comprises: one or more second processors; and second memory storing second instructions that, when executed by the one or more second processors, cause the second computing device to: send the data from the remote application.

(S8) A system as described in paragraph (S7), wherein the preference data indicates, for at least one of the plurality of updated schedule items, a degree of preference.

(S9) A system as described in paragraph (S7) or (S8), wherein the first instructions, when executed by the one or more first processors, cause the first computing device to determine the change to the schedule item by: storing a first version of the data; retrieving a second version of the data; and comparing the first version of the data with the second version of the data.

(S10) A system as described in any one of paragraphs (S7)-(S9), wherein the first instructions, when executed by the one or more first processors, cause the first computing device to generate the individual scores by: determining, based on the preference data, the at least one of the plurality of updated schedule items corresponding to a greatest degree of preference.

(S11) A system as described in any one of paragraphs (S7)-(S10), wherein the first instructions, when executed by the one or more first processors, cause the first computing device to determine, based on the preference data, a second plurality of updated schedule items, wherein the first instructions, when executed by the one or more first processors, cause the first computing device to modify the schedules further based on the second plurality of updated schedule items.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   identifying, by a computing device and based on inputs received from a user and by the computing device, a plurality of periods of time in which to access one or more resources, wherein the inputs indicate a range of time in which to use the one or more resources;
   receiving, by the computing device, data, from at least one remote application, indicative of locations of a plurality of users of the one or more resources over one or more time periods, and wherein the at least one remote application comprises an application other than a calendar application;
   determining, by the computing device and based on the received data, a plurality of anticipated locations of the plurality of users within the range of time;
   generating, by the computing device, a plurality of individual scores for the plurality of users by determining, for each user of the plurality of users, an individual score based on a geographic distance between one or more of the plurality of anticipated locations that correspond to the user and one or more locations of the one or more resources;
   processing the plurality of individual scores for the plurality of users by comparing at least two of the plurality of individual scores; and
   selecting, by the computing device and based on the processing, a resource from the one or more resources.

2. The method of claim 1, wherein generating the plurality of individual scores is further based on schedule data, associated with the calendar application, that indicates schedules of the plurality of users over the range of time.

3. The method of claim 1, further comprising:
   receiving, by the computing device and from a second remote application different from the remote application, personnel data comprising an indication of a historical availability of the plurality of users, wherein generating the plurality of individual scores is further based on the personnel data.

4. The method of claim 1, further comprising:
   receiving, by the computing device and from a second remote application different from the calendar application, weather data that indicates anticipated weather associated with the range of time, wherein generating the plurality of individual scores is further based on the weather data.

5. The method of claim 1, wherein selecting the resource is based on determining that at least one of the plurality of users is a predetermined distance from the one or more locations of the one or more resources.

6. The method of claim 1, further comprising:
   detecting a change to the data; and
   selecting, based on the change to the data and from the one or more resources, a second resource.

7. The method of claim 6, wherein the detecting the change to the data comprises:
   querying a device associated with at least one of the plurality of users;
   receiving, from the device, a current location of the at least one of the plurality of users; and
   determining, based on the current location, that the at least one of the plurality of users is greater than a predetermined distance from a first location associated with the resource.

8. The method of claim 1, wherein the remote application comprises a building access system, and wherein the plurality of anticipated locations of the plurality of users are based on access, by at least one of the plurality of users, to one or more locations associated with the building access system.

9. The method of claim 1, wherein the one or more resources comprise one or more meeting rooms, and wherein selecting the resource comprises comparing a count of the plurality of users to occupancy limits of the one or more meeting rooms.

10. A system comprising:
a first computing device; and
a second computing device;
wherein the first computing device comprises:
one or more first processors; and
first memory storing first instructions that, when executed by the one or more first processors, cause the first computing device to:
store data associated with at least one application that indicates locations of a plurality of users of the at least one application over one or more time periods, wherein the at least one application comprises an application other than a calendar application; and
send, to the second computing device and via a network, the data;
wherein the second computing device comprises:
one or more second processors; and
second memory storing second instructions that, when executed by the one or more second processors, cause the second computing device to:
receive user input indicating a range of time in which to use one or more resources;
receive, via the network, the data;
determine, based on the data, a plurality of anticipated locations of the plurality of users within the range of time;
generate a plurality of individual scores for the plurality of users by determining, for each user of the plurality of users, an individual score based on a geographic distance between one or more of the plurality of anticipated locations that correspond to the user and one or more locations of the one or more resources;
process the plurality of individual scores for the plurality of users by comparing at least two of the plurality of individual scores; and
select, based on the processing, a resource from the one or more resources.

11. The system of claim 10, wherein the second memory, when executed by the one or more second processors, causes the second computing device to generate the plurality of individual scores further based on schedule data, associated with a calendar application, that indicates schedules of the plurality of users over the range of time.

12. The system of claim 10, wherein the second memory, when executed by the one or more second processors, causes the second computing device to:
receive, from a second remote application different from the at least one application, personnel data comprising an indication of a historical availability of the plurality of users, wherein the second memory, when executed by the one or more second processors, causes the second computing device to generate the plurality of individual scores further based on the personnel data.

13. The system of claim 10, wherein the second memory, when executed by the one or more second processors, causes the second computing device to:
receive, from a second remote application different from the at least one application, weather data that indicates anticipated weather associated with the range of time, wherein the second memory, when executed by the one or more second processors, causes the second computing device to generate the plurality of individual scores further based on the weather data.

14. The system of claim 10, wherein the second memory, when executed by the one or more second processors, causes the second computing device to select the resource further based on determining that at least one of the plurality of users is a predetermined distance from the one or more locations of the one or more resources.

15. The system of claim 10, wherein the second memory, when executed by the one or more second processors, causes the second computing device to:
detect a change to the data; and
select, based on the change to the data and from the one or more resources, a second resource.

16. A computing device comprising:
one or more processors; and
memory storing instructions that, when executed by the one or more processors, cause the computing device to:
identify, based on inputs received from a user, a plurality of periods of time in which to access one or more resources, wherein the inputs indicate a range of time in which to use the one or more resources;
receive data, from at least one remote application, indicative of locations of plurality of users of the one or more resources over plurality of time periods, and wherein the at least one remote application is an application other than a calendar application;
determine, based on the received data, plurality of anticipated locations of the plurality of users within the range of time;
generate a plurality of individual scores for the plurality of users by determining, for each user of the plurality of users, an individual score based on a geographic distance between one or more of the plurality of anticipated locations that corresponds to the user and one or more locations of the one or more resources; and
process the plurality of individual scores for the plurality of users by comparing at least two of the plurality of individual scores;
select, based on the processing, a resource from the one or more resources.

17. The computing device of claim 16, wherein the instructions, when executed by the one or more processors, cause the computing device to generate the plurality of individual scores further based on schedule data, associated with the calendar application, that indicates schedules of the plurality of users over the range of time.

18. The computing device of claim 16, wherein the instructions, when executed by the one or more processors, further cause the computing device to:
receive, from a second remote application different from the remote application, personnel data comprising an indication of a historical availability of the plurality of users, wherein generating the plurality of individual scores is further based on the personnel data.

19. The computing device of claim 16, wherein the instructions, when executed by the one or more processors, further cause the computing device to:

receive, from a second remote application different from the calendar application, weather data that indicates anticipated weather associated with the range of time, wherein generating the plurality of individual scores is further based on the weather data.

20. The computing device of claim 16, wherein the instructions, when executed by the one or more processors, cause the computing device to select the resource based on determining that at least one of the plurality of users is a predetermined distance from the one or more locations of the one or more resources.

* * * * *